US012793313B2

(12) United States Patent
Boyd et al.

(10) Patent No.: US 12,793,313 B2
(45) Date of Patent: Nov. 10, 2026

(54) GENERATIVE AI PET AVATAR GENERATION

(71) Applicant: Snap Inc., Santa Monica, CA (US)

(72) Inventors: Nathan Kenneth Boyd, Los Angeles, CA (US); Swetha Dhamodharan, San Francisco, CA (US); Ke Xiao, Mountain View, CA (US)

(73) Assignee: Snap Inc., Santa Monica, CA (US)

( * ) Notice: Subject to any disclaimer, the term of this patent is extended or adjusted under 35 U.S.C. 154(b) by 205 days.

(21) Appl. No.: 18/742,835

(22) Filed: Jun. 13, 2024

(65) Prior Publication Data

US 2025/0384608 A1 Dec. 18, 2025

(51) Int. Cl.

| | |
|---|---|
| ***G06T 13/40*** | (2011.01) |
| ***G06F 40/10*** | (2020.01) |
| ***G06T 19/00*** | (2011.01) |
| ***G06V 10/82*** | (2022.01) |
| ***G06V 20/20*** | (2022.01) |
| ***G06V 40/10*** | (2022.01) |

(52) U.S. Cl.

CPC .............. *G06T 13/40* (2013.01); *G06F 40/10* (2020.01); *G06T 19/006* (2013.01); *G06V 10/82* (2022.01); *G06V 20/20* (2022.01); *G06V 40/10* (2022.01)

(58) Field of Classification Search

CPC ....... G06T 13/40; G06T 19/006; G06F 40/10; G06V 20/20; G06V 40/10; G06V 10/82

USPC .......................................................... 345/474

See application file for complete search history.

(56) References Cited

U.S. PATENT DOCUMENTS

| | | | |
|---|---|---|---|
| 6,334,149 | B1 | 12/2001 | Davis, Jr. et al. |
| 6,487,601 | B1 | 11/2002 | Hubacher et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,684,238 | B1 | 1/2004 | Dutta |
| 6,720,860 | B1 | 4/2004 | Narayanaswami |

(Continued)

FOREIGN PATENT DOCUMENTS

| | | |
|---|---|---|
| CN | 109863532 | 6/2019 |
| CN | 110168478 | 8/2019 |

(Continued)

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Hai Tao Sun

(74) *Attorney, Agent, or Firm* — Schwegman Lundberg & Woessner, P.A.

(57) ABSTRACT

Described is a system for virtual pet generation by receiving, by a computing device of a first user, a real life image of a pet; identifying a prompt corresponding to desired characteristics of a first virtual pet avatar for the first user; processing the real life image of the pet and the prompt by a first generative Artificial Intelligence (AI) model, the first generative AI model being trained to receive images and prompts and to generate virtual pet avatars based on the received images and prompts; and receiving a first virtual pet avatar from the first generative AI model.

20 Claims, 12 Drawing Sheets

(56) References Cited

U.S. PATENT DOCUMENTS

| | | | |
|---|---|---|---|
| 6,832,222 | B1 | 12/2004 | Zimowski |
| 6,959,324 | B1 | 10/2005 | Kubik et al. |
| 6,970,907 | B1 | 11/2005 | Ullmann et al. |
| 7,188,143 | B2 | 3/2007 | Szeto |
| 7,237,002 | B1 | 6/2007 | Estrada et al. |
| 7,240,089 | B2 | 7/2007 | Boudreau |
| 7,280,658 | B2 | 10/2007 | Amini et al. |
| 8,032,586 | B2 | 10/2011 | Challenger et al. |
| 8,161,115 | B2 | 4/2012 | Yamamoto |
| 8,402,097 | B2 | 3/2013 | Szeto |
| 8,768,876 | B2 | 7/2014 | Shim et al. |
| 8,775,972 | B2 | 7/2014 | Spiegel |
| 8,832,201 | B2 | 9/2014 | Wall |
| 8,856,349 | B2 | 10/2014 | Jain et al. |
| 8,909,725 | B1 | 12/2014 | Sehn |
| 8,972,357 | B2 | 3/2015 | Shim et al. |
| 9,015,285 | B1 | 4/2015 | Ebsen et al. |
| 9,094,137 | B1 | 7/2015 | Sehn et al. |
| 9,105,014 | B2 | 8/2015 | Collet et al. |
| 9,113,301 | B1 | 8/2015 | Spiegel et al. |
| 9,143,382 | B2 | 9/2015 | Bhogal et al. |
| 9,143,681 | B1 | 9/2015 | Ebsen et al. |
| 9,225,897 | B1 | 12/2015 | Sehn et al. |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,430,783 | B1 | 8/2016 | Sehn |
| 9,459,778 | B2 | 10/2016 | Hogeg et al. |
| 9,532,171 | B2 | 12/2016 | Allen et al. |
| 9,537,811 | B2 | 1/2017 | Allen et al. |
| 9,628,950 | B1 | 4/2017 | Noeth et al. |
| 9,749,270 | B2 | 8/2017 | Collet et al. |
| 9,854,219 | B2 | 12/2017 | Sehn |
| 9,911,073 | B1 | 3/2018 | Spiegel et al. |
| 9,980,100 | B1 | 5/2018 | Charlton et al. |
| 10,155,168 | B2 | 12/2018 | Blackstock et al. |
| 10,158,589 | B2 | 12/2018 | Collet et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,348,662 | B2 | 7/2019 | Baldwin et al. |
| 10,432,559 | B2 | 10/2019 | Baldwin et al. |
| 10,454,857 | B1 | 10/2019 | Blackstock et al. |
| 10,656,797 | B1 | 5/2020 | Alvi et al. |
| 10,657,695 | B2 | 5/2020 | Chand et al. |
| 10,674,311 | B1 | 6/2020 | Bouba et al. |
| 10,762,174 | B2 | 9/2020 | Denton et al. |
| 10,872,451 | B2 | 12/2020 | Sheth et al. |
| 10,880,246 | B2 | 12/2020 | Baldwin et al. |
| 10,893,385 | B1 | 1/2021 | Berardino et al. |
| 10,895,964 | B1 | 1/2021 | Grantham et al. |
| 10,896,534 | B1 | 1/2021 | Smith et al. |
| 10,933,311 | B2 | 3/2021 | Brody et al. |
| 10,936,066 | B1 | 3/2021 | Jaureguiberry et al. |
| 10,938,758 | B2 | 3/2021 | Allen et al. |
| 10,939,246 | B1 | 3/2021 | Dancie et al. |
| 10,945,098 | B2 | 3/2021 | Dancie et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,032,670 | B1 | 6/2021 | Baylin et al. |
| 11,036,781 | B1 | 6/2021 | Baril et al. |
| 11,039,270 | B2 | 6/2021 | Bouba et al. |
| 11,063,891 | B2 | 7/2021 | Voss |
| 11,069,103 | B1 | 7/2021 | Blackstock et al. |
| 11,080,917 | B2 | 8/2021 | Monroy-hernández et al. |
| 11,128,586 | B2 | 9/2021 | Al Majid et al. |
| 11,166,123 | B1 | 11/2021 | Guillaume |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,275,439 | B2 | 3/2022 | Jaureguiberry et al. |
| 11,284,144 | B2 | 3/2022 | Kotsopoulos et al. |
| 11,294,936 | B1 | 4/2022 | Jaureguiberry |
| 11,307,747 | B2 | 4/2022 | Dancie et al. |
| 12,293,604 | B1 * | 5/2025 | Lotti ........................ G06T 17/00 |
| 2011/0115798 | A1 | 5/2011 | Nayar et al. |
| 2014/0129953 | A1 | 5/2014 | Spiegel |
| 2014/0173424 | A1 | 6/2014 | Hogeg et al. |
| 2015/0365795 | A1 | 12/2015 | Allen et al. |
| 2016/0006927 | A1 | 1/2016 | Sehn |
| 2016/0014063 | A1 | 1/2016 | Hogeg et al. |
| 2016/0085773 | A1 | 3/2016 | Chang et al. |
| 2016/0085863 | A1 | 3/2016 | Allen et al. |
| 2016/0099901 | A1 | 4/2016 | Allen et al. |
| 2016/0180887 | A1 | 6/2016 | Sehn |
| 2016/0182422 | A1 | 6/2016 | Sehn et al. |
| 2016/0182875 | A1 | 6/2016 | Sehn |
| 2016/0239248 | A1 | 8/2016 | Sehn |
| 2016/0277419 | A1 | 9/2016 | Allen et al. |
| 2016/0321708 | A1 | 11/2016 | Sehn |
| 2017/0113140 | A1 | 4/2017 | Blackstock et al. |
| 2017/0287006 | A1 | 10/2017 | Azmoodeh et al. |
| 2018/0113587 | A1 | 4/2018 | Allen et al. |
| 2018/0115503 | A1 | 4/2018 | Baldwin et al. |
| 2018/0198743 | A1 | 7/2018 | Blackstock et al. |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2019/0001223 | A1 | 1/2019 | Blackstock et al. |
| 2019/0097958 | A1 | 3/2019 | Collet et al. |
| 2019/0188920 | A1 | 6/2019 | Mcphee et al. |
| 2019/0280997 | A1 | 9/2019 | Baldwin et al. |
| 2020/0306637 | A1 | 10/2020 | Baldwin et al. |
| 2020/0312003 | A1 * | 10/2020 | Borovikov ............... G06N 7/01 |
| 2020/0314586 | A1 | 10/2020 | Bouba et al. |
| 2020/0372127 | A1 | 11/2020 | Denton et al. |
| 2020/0382912 | A1 | 12/2020 | Dancie et al. |
| 2020/0401225 | A1 | 12/2020 | Jaureguiberry et al. |
| 2020/0410575 | A1 | 12/2020 | Grantham et al. |
| 2021/0011612 | A1 | 1/2021 | Dancie et al. |
| 2021/0074047 | A1 | 3/2021 | Sheth et al. |
| 2021/0089179 | A1 | 3/2021 | Grantham et al. |
| 2021/0104087 | A1 | 4/2021 | Smith et al. |
| 2021/0152979 | A1 | 5/2021 | Berardino et al. |
| 2021/0168108 | A1 | 6/2021 | Antmen et al. |
| 2021/0170270 | A1 | 6/2021 | Brody et al. |
| 2021/0192823 | A1 | 6/2021 | Amitay et al. |
| 2021/0209825 | A1 | 7/2021 | Assouline et al. |
| 2021/0225058 | A1 | 7/2021 | Chand et al. |
| 2021/0240315 | A1 | 8/2021 | Alvi et al. |
| 2021/0243482 | A1 | 8/2021 | Baril et al. |
| 2021/0266277 | A1 | 8/2021 | Allen et al. |
| 2021/0266704 | A1 | 8/2021 | Dancie et al. |
| 2021/0281897 | A1 | 9/2021 | Brody et al. |
| 2021/0285774 | A1 | 9/2021 | Collins et al. |
| 2021/0306290 | A1 | 9/2021 | Voss |
| 2021/0306451 | A1 | 9/2021 | Heikkinen et al. |
| 2021/0377693 | A1 | 12/2021 | Bouba et al. |
| 2021/0385180 | A1 | 12/2021 | Al Majid et al. |
| 2021/0405831 | A1 | 12/2021 | Mourkogiannis et al. |
| 2021/0409535 | A1 | 12/2021 | Mourkogiannis et al. |
| 2021/0409904 | A1 | 12/2021 | Baylin et al. |
| 2022/0012929 | A1 | 1/2022 | Blackstock et al. |
| 2022/0174455 | A1 | 6/2022 | Guillaume |
| 2022/0269345 | A1 | 8/2022 | Jaureguiberry et al. |
| 2024/0169622 | A1 * | 5/2024 | Xie ......................... G06T 11/10 |

FOREIGN PATENT DOCUMENTS

| | | |
|---|---|---|
| WO | 2013166588 | 11/2013 |
| WO | 2014194262 | 12/2014 |
| WO | 2016044424 | 3/2016 |
| WO | 2016054562 | 4/2016 |

(56) References Cited

FOREIGN PATENT DOCUMENTS

| | | |
|---|---|---|
| WO | 2016065131 | 4/2016 |
| WO | 2016100318 | 6/2016 |
| WO | 2016100342 | 6/2016 |
| WO | 2016149594 | 9/2016 |
| WO | 2016179166 | 11/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

"Instant Comics Starring You and Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, Online] Retrieved from the Internet: <URL: https://www.theverge.com/2018/11/13/18088772/snapchat-friendship-profiles-bitmoji-merchandise-comics>, (Nov. 13, 2018), 5 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable- geofilters-2448152>, (Nov. 18, 2016), 6 pgs.

* cited by examiner

GENERATIVE AI PET AVATAR GENERATION

TECHNICAL FIELD

The present disclosure relates generally to pet avatar generation, and more specifically to pet avatar generation using generative Artificial Intelligence (AI).

BACKGROUND

As the popularity of Artificial Intelligence (AI) grows, companies use machine learning models in various ways, which is transforming how we process, analyze, and interact with visual data. The use of AI in image processing involves training algorithms, particularly deep learning models like Convolutional Neural Networks (CNNs), to perform tasks that range from low-level image manipulation to high-level understanding and generation of visual content. Some prominent applications of AI in images include image classification, object detection, image segmentation, facial recognition, and style transfer.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
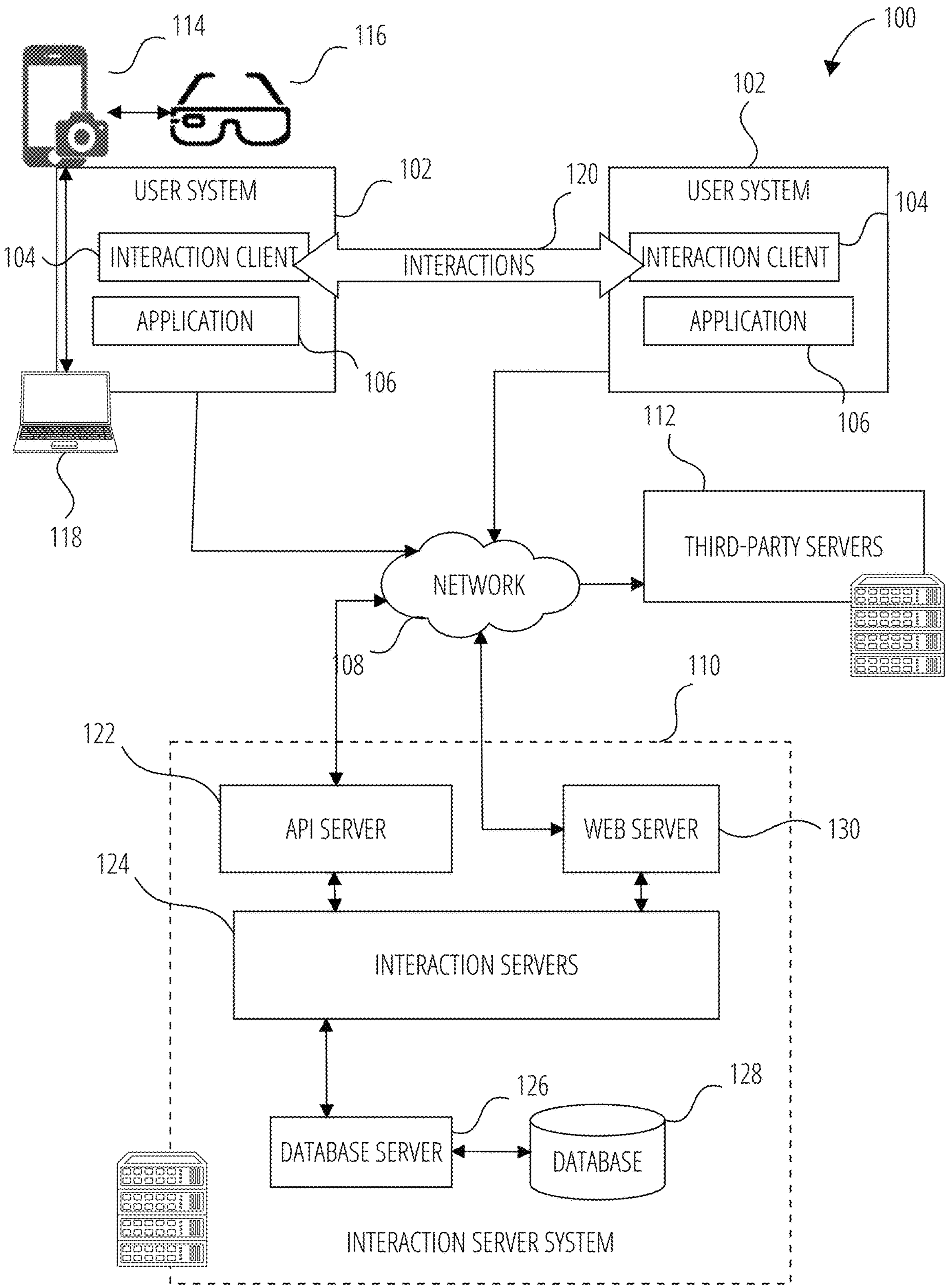
FIG. 1 is a diagrammatic representation of a networked environment in which the present disclosure may be deployed, according to some examples.

Traditional systems for virtual pet avatar generation can encounter several pitfalls that can impact the user experience and the quality of the generated avatars. Traditional systems may produce virtual pet avatars with limited variation, resulting in avatars that look similar or lack diversity in features, expressions, and behaviors.

Some traditional systems rely on pre-designed templates for virtual pet avatars, which can lead to generic and repetitive designs that do not capture the uniqueness of each user's real-life pet. Moreover, without robust personalization features, traditional systems may fail to capture the specific characteristics, personality traits, and preferences of users' real-life pets, leading to less engaging and relatable avatars.

Traditional systems may have limited flexibility in generating avatars based on user input, such as prompts or descriptions, resulting in avatars that do not fully match user expectations or desires. Avatars generated by traditional systems may have a static appearance without dynamic features, animations, or interactive elements, limiting their ability to engage users and adapt to different contexts.

Integrating virtual pet avatars generated by traditional systems into various platforms and applications may be challenging, leading to inconsistencies in appearance, functionality, and user experience across different environments. Scaling traditional systems to handle a large volume of user requests or customizing avatars based on evolving user preferences and trends can be challenging and resource-intensive.

Users may have limited control over the generation process and the final appearance of their virtual pet avatars, reducing their sense of ownership and satisfaction with the generated avatars. Traditional systems may struggle to achieve high-quality and realistic avatars, especially in terms of visual fidelity, animation smoothness, and lifelike behaviors, which can affect user immersion and enjoyment.

Ensuring data privacy and security, especially when dealing with user-provided images and personal information for avatar generation, can be a concern with traditional systems that may not have robust safeguards in place.

These pitfalls highlight the limitations and challenges faced by traditional systems in virtual pet avatar generation, emphasizing the need for innovative approaches and advanced technologies to overcome these issues and provide users with a more personalized, engaging, and satisfying avatar creation experience.

Example embodiments of the interaction system described herein improves on each of the pitfalls associated with traditional systems in virtual pet avatar generation. The interaction system employs generative AI techniques that allow for a wide range of variation in virtual pet avatars. By leveraging advanced algorithms and training models on diverse datasets, the interaction system ensures that each avatar is unique and distinct, capturing a broad spectrum of features, expressions, and behaviors.

Unlike generic templates, the interaction system creates virtual pet avatars from scratch based on user-provided inputs and real-life pet images. This customization ensures that avatars accurately reflect the individual characteristics and appearance of each user's pet, avoiding generic or repetitive designs.

The interaction system prioritizes personalization by integrating user preferences, prompts, and descriptions into the avatar generation process. This results in avatars that align closely with users' expectations, capturing specific traits, personalities, and preferences for a more engaging and relatable experience.

With the interaction system, users have more control and flexibility in generating avatars based on their inputs. Advanced AI models adapt to user-provided prompts and descriptions, allowing for nuanced variations and adjustments to meet user expectations effectively.

Avatars created by the interaction system are designed to be dynamic, with animated elements, lifelike behaviors, and interactive functionalities. This enhances user engagement and allows avatars to adapt to different contexts, providing a more immersive and enjoyable experience.

The interaction system ensures seamless integration of virtual pet avatars into various platforms and applications. Avatars maintain consistency in appearance, functionality, and user experience across different environments, enhancing overall usability and user satisfaction.

Users have greater control over the avatar generation process with the interaction system. They can provide detailed inputs, make real-time adjustments, and choose from multiple variations, empowering them to create avatars that truly represent their preferences and vision.

The interaction system prioritizes quality and realism in avatar generation. Utilizing advanced rendering techniques, animation algorithms, and AI-based simulations, the interaction system delivers high-fidelity avatars with lifelike movements, expressions, and visual details, enhancing user immersion and enjoyment.

The interaction system is designed to scale efficiently to handle large volumes of user requests while maintaining customization and adaptability. The interaction system leverages scalable infrastructure, optimized algorithms, and continuous model improvements to meet evolving user needs and preferences.

The interaction system prioritizes data privacy and security in the interaction system architecture. Robust encryption protocols, secure data handling practices, and user consent mechanisms ensure that user-provided images and personal information are protected throughout the avatar generation process, maintaining user trust and confidentiality.

Overall, the interaction system addresses the shortcomings of traditional systems in virtual pet avatar generation by offering advanced customization, personalization, control, integration, and security features that elevate the user experience and deliver highly engaging and realistic avatars tailored to each user's preferences and pet characteristics.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in a virtual pet generation process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the other interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106)

and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different applications 106 (or applets) can vary based on how the menu is launched by the user (e.g., from a conversation interface or from a non-conversation interface).

System Architecture

Figure 2:
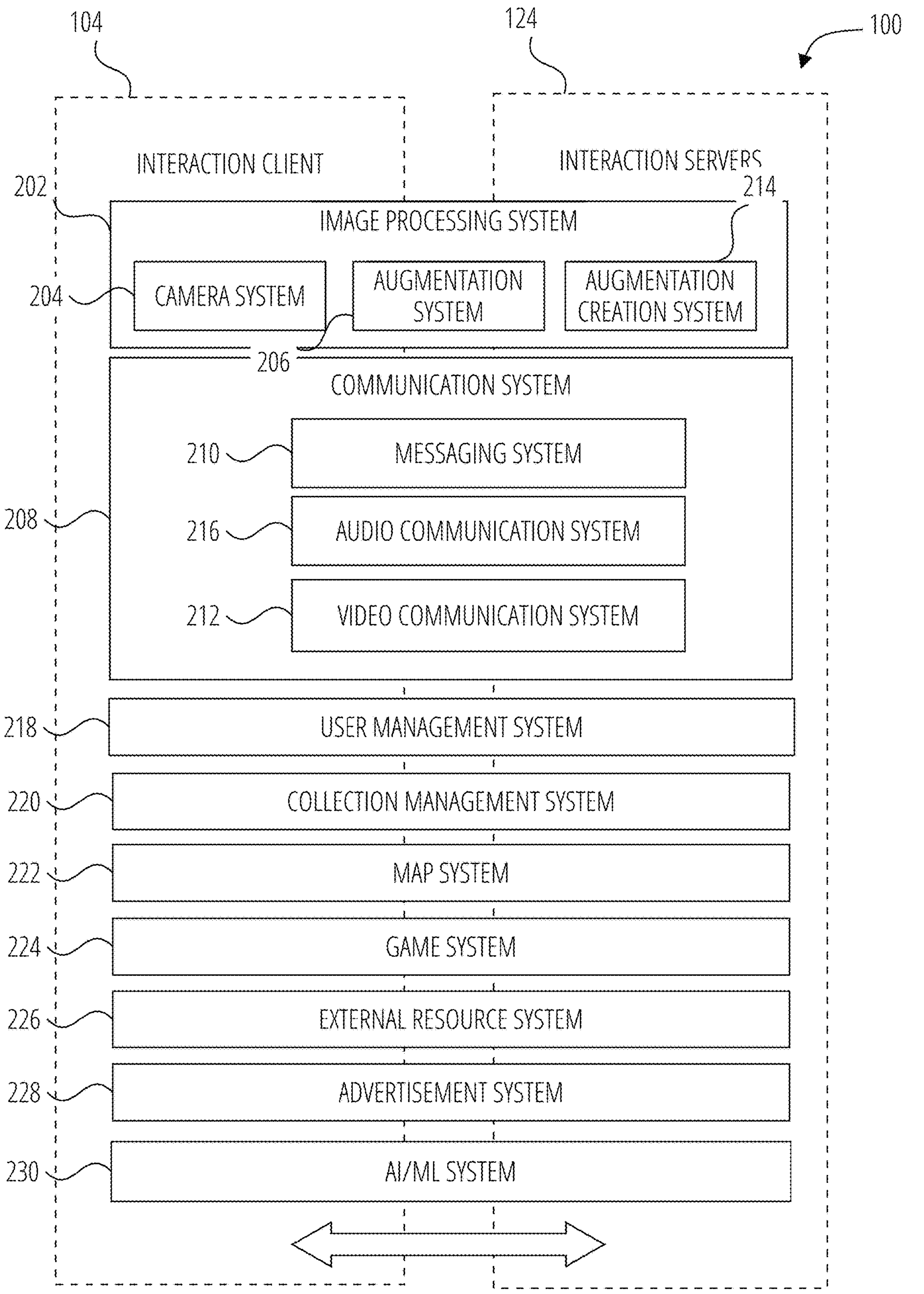
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of a microservice subsystem may include:

- Function logic: The function logic implements the functionality of the microservice subsystem, representing a specific capability or function that the microservice provides.
- API interface: Microservices may communicate with other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1002 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
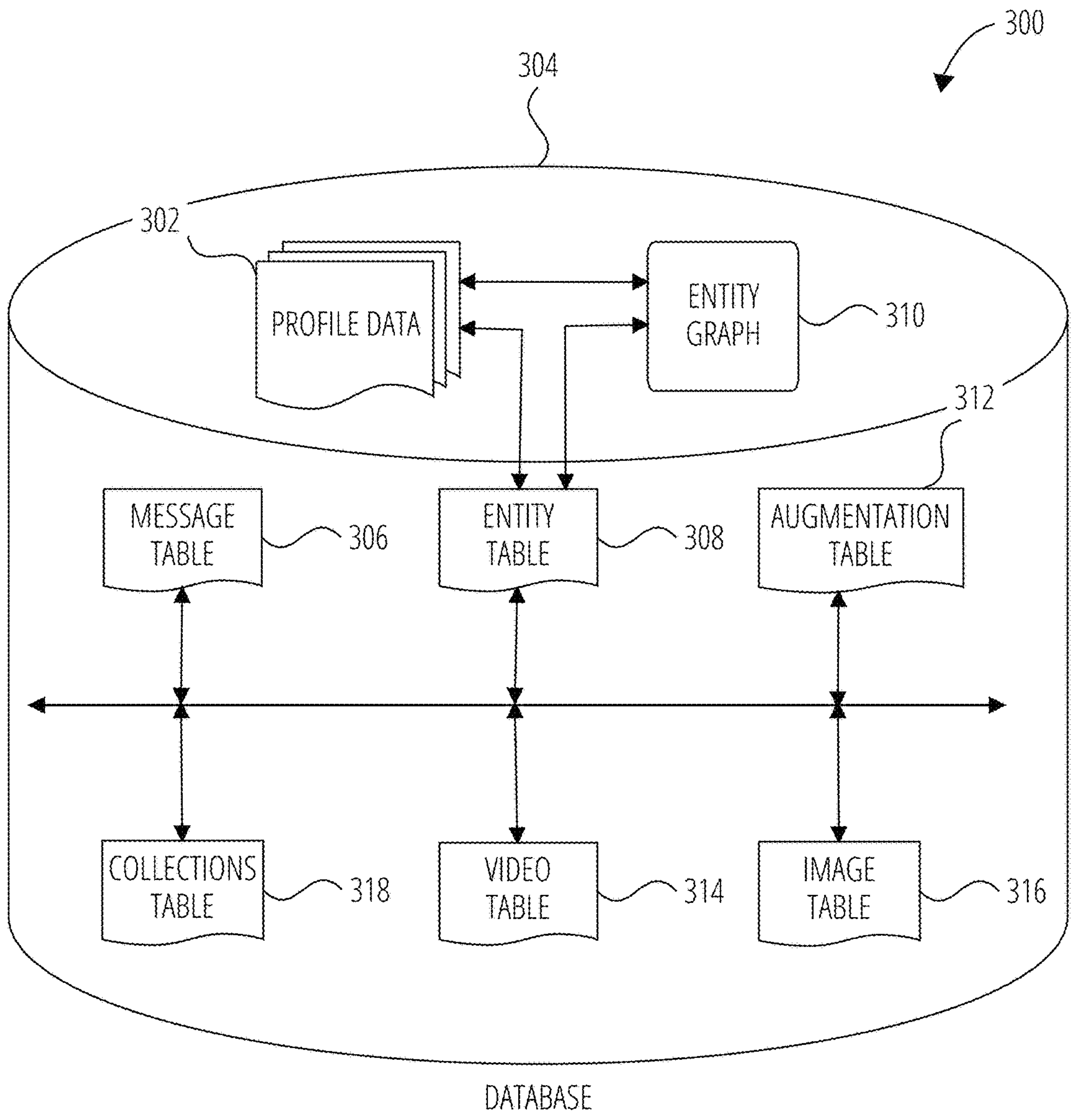
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database). In some cases, the database 304 includes features of or corresponds to database 128 in FIG. 1, and/or vice versa.

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

Generating Virtual Pet Avatar Using Generative AI

Figure 4:
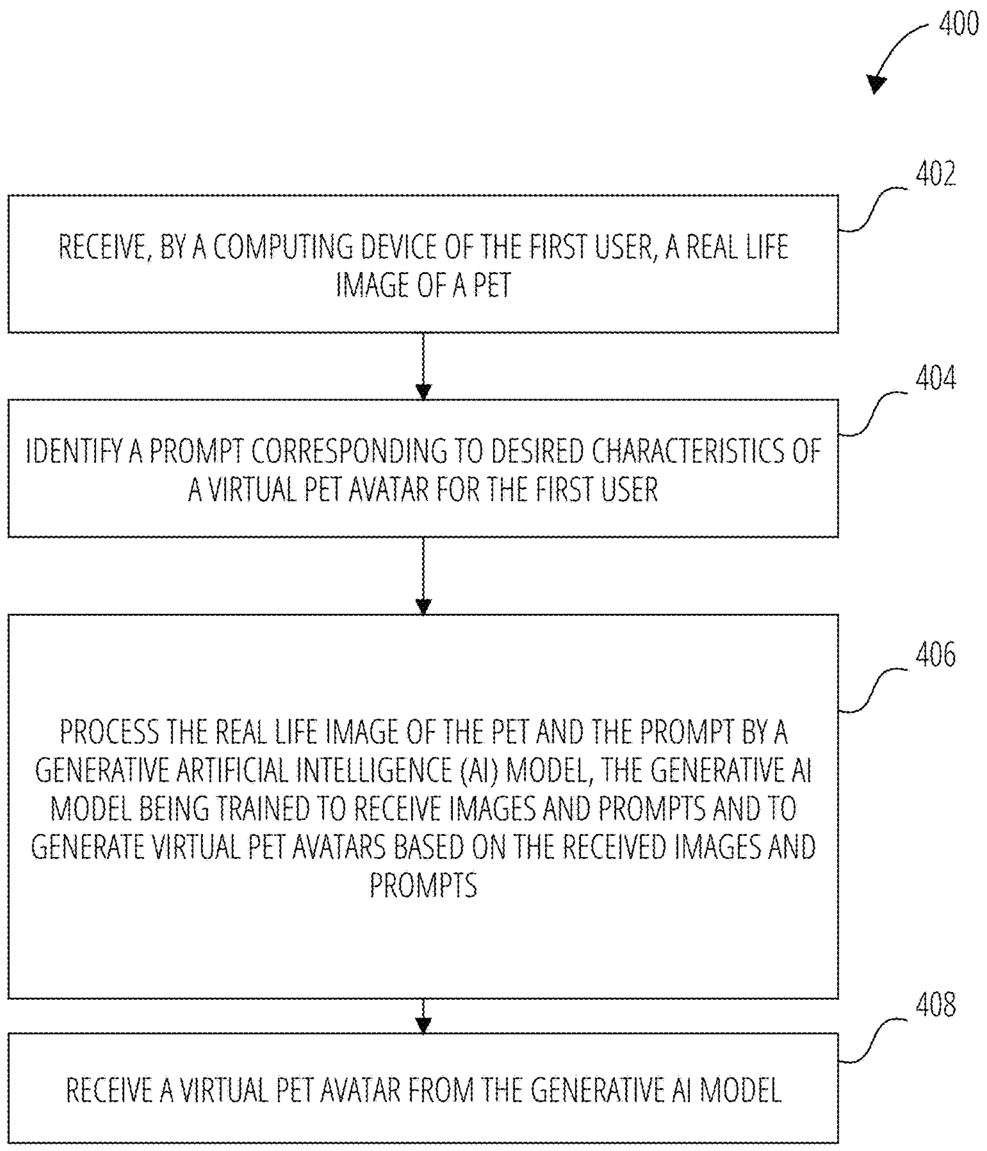
FIG. 4 illustrates an example method for generating a virtual pet avatar using generative AI, according to some examples.

FIG. 4 illustrates an example method 400 for generating a virtual pet avatar using generative AI, according to some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

FIG. 4 is described as being performed by certain systems or applying certain processes, such as a particular machine learning model or computer vision model, but the processes described herein can be performed by one or more other or the same machine learning models, computer vision models, or a combination thereof.

Extended Reality (XR) is an umbrella term encapsulating Augmented Reality (AR), Virtual Reality (VR), Mixed Reality (MR), and everything in between. For the sake of simplicity, examples are described using one type of system, such as XR or AR. However, it is appreciated that other types of systems apply.

At operation 402, the interaction system receives, by a computing device of the first user, a real-life image of a pet. The interaction system obtains a digital image of a real pet, which will be used as an input to create a virtual pet avatar.

There are several methods through which the interaction system can receive the real-life image of a pet. The user can directly upload an image of their pet from their device's storage. The user can select a photo of their pet from their phone's gallery and upload it to the application. The user can take a picture of their pet using the device's camera in real time. For example, the user opens the application, selects the camera function, and takes a photo of their cat.

The interaction system can access the user's profile or other connected platforms to retrieve images where the pet is featured. For example, the user has previously uploaded pictures of their pet on their social media account, and the application retrieves one of these images.

The system accesses profile data of the user. Profile data of users includes personal information, such as a name, email address, phone number, date of birth, gender, education, occupation, interests, and/or the like. Profile data includes preferences, such as a preference of an animal type or breed.

Profile data of users includes profile pictures, cover photos, biographies, and any other customizations made by the user to their online profiles. Profile data of users includes connections and relationships with other users, such as a user's friends, followers, and connections, as well as the groups and pages they follow or like. For example, profile data includes data uploaded by a user of a pet or images of pets uploaded by friends of the user.

Profile data of users includes content users share, such as text, photos, videos, links, direct messages, comments, and any other interactions users have within the platform. Profile data of users includes how users interact with the platform's services, such as the content they view, like, share, or engage with, as well as the features they use and the duration of their sessions. For example, profile data includes a user's likes or discussions about a certain breed of a pet in a chat with another user.

Profile data of users includes location data, such as the user's city or precise GPS coordinates, such as when using location-based features or when sharing content with location tags. Profile data includes common pets found in such areas, such as a certain breed of a pet, a type of pet, or style of a pet.

The interaction system can capture still images from a live video stream if the user is streaming a video that includes their pet. For example, the user starts a live video stream with their pet, and the interaction system captures a frame from the stream to use as an image.

The system can identify and extract images from user interactions within the interaction system, such as via interaction functions. Such interactions can include likes, comments, or other engagements with pet-related content. For example, the user frequently likes and comments on posts featuring Golden Retrievers. The system identifies this and retrieves an image of a Golden Retriever from these interactions.

The interaction system provides an interface (e.g., upload button, camera access prompt) for the user to provide an image or video. This interface is designed to be user-friendly and may guide the user through the process of selecting or capturing an image. The interaction system can include a user interface element "Upload Your Pet's Photo" button that, when clicked, opens the device's file picker or camera.

In some cases, the user submits a link to a real-life pet image. For example, the user submits a link from a search result or a website address that displays a real-life pet image of a real-life pet owned by the user. In some cases, the interaction system integrates with cloud storage services, allowing users to select and upload images directly from their cloud accounts.

The interaction system can integrate with smart home devices such as security cameras or pet cameras that capture images of the pet. For example, a smart pet camera captures photos of the user's dog and uploads them to the application.

The interaction system can automatically identify and retrieve images from social media platforms where the pet is tagged. For example, the user tags their dog in a social media post, and the interaction system retrieves this image. The interaction system can identify that a dog is in the image by performing computer vision using a machine learning model, such as a convolutional machine learning model. In some cases, the interaction system identifies that a dog is in the image by the text associated with the post, such as "here is my dog!"

The interaction system uses facial recognition technology to identify and retrieve images of the pet from a gallery of mixed images. The system scans the user's photo library and automatically identifies and uploads photos featuring the pet's face.

The interaction system triggers an image capture when the user visits specific pet-friendly locations (e.g., dog parks, pet stores). The user's phone captures a photo when they visit a dog park, and the app prompts them to upload it.

The interaction system monitors the user's interactions on pet-related posts and requests images based on these interactions. The user likes a picture of a certain breed on social media, and the interaction system suggests uploading a similar image.

The user captures images of their pet using AR functionalities within the interaction system. For example, the user uses an AR feature to capture a 3D image of their pet, which is then processed by the app. The interaction system integrates with wearable devices (e.g., pet collars with cameras) that capture and upload images. For example, a camera-equipped pet collar captures and uploads photos of the pet's daily activities.

Figure 5:
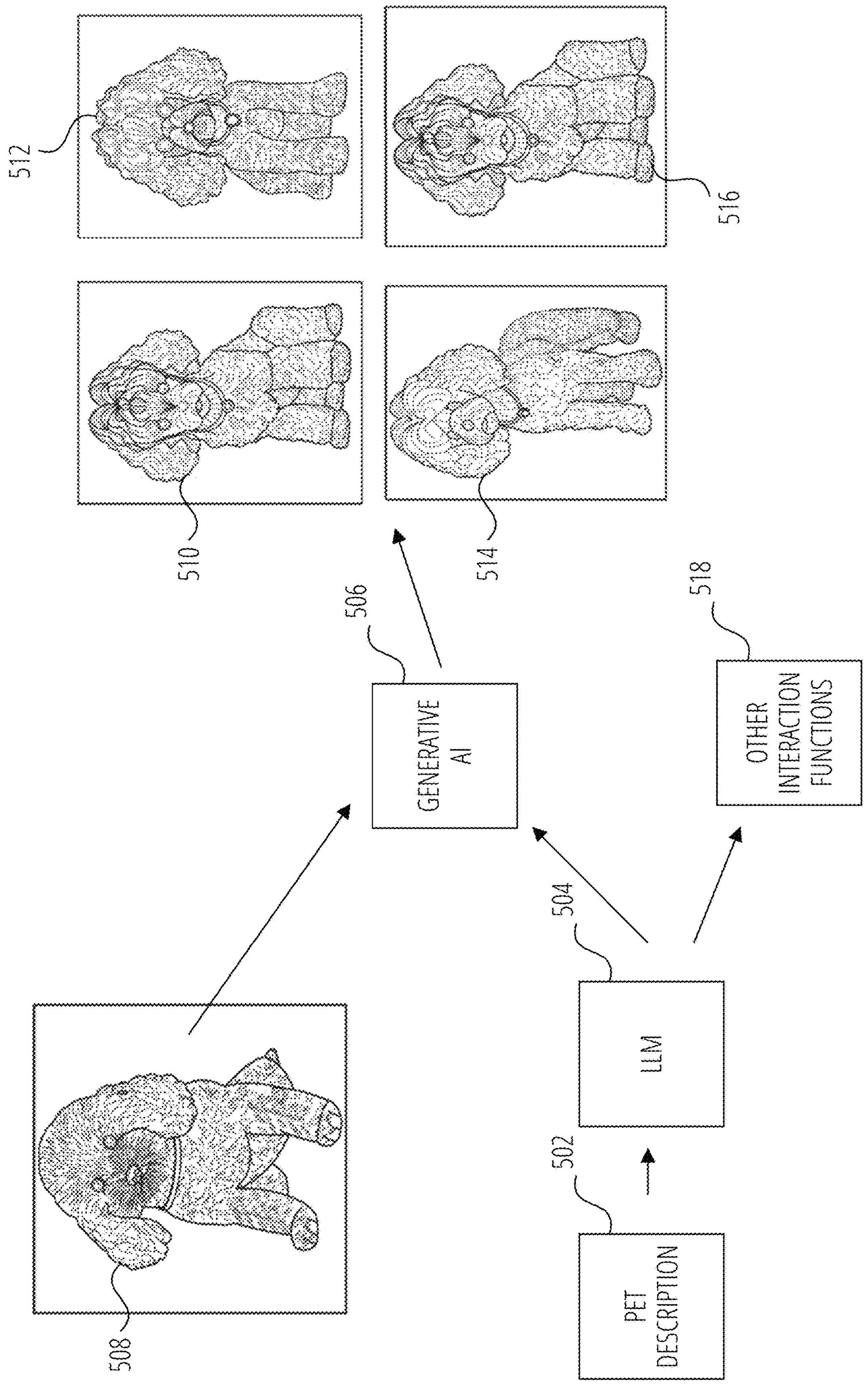
FIG. 5 illustrates an example architecture for generating a virtual pet, according to some examples.

FIG. 5 illustrates an example architecture for generating a virtual pet, according to some examples. The user can take a picture of his or her real-life pet and submit the real-life image 508 to the interaction system. The interaction system can then apply the real-life image 508 to generate a virtual pet avatar for the user.

Returning to FIG. 4, at operation 404, the interaction system identifies a prompt corresponding to desired characteristics of a virtual pet avatar for the first user. The interaction system receives input from a second user for a pet avatar. The system can receive various types of input from a second user that are related to a pet avatar. In some cases, the inputs allow the second user to personalize and customize the appearance and characteristics of the pet avatar.

In some cases, the user can select among different categorize animals (e.g., mammals, birds, reptiles, exotic) to help users navigate through different types of pets. In some cases, the user interface enables a search bar for users to quickly find specific animals by name.

The user can select or modify the pet avatar's appearance, including options for species or breed by choosing the type of pet (e.g., dog, cat, bird) and specific breed. The user can select a color or pattern by selecting colors and patterns for the pet's fur, feathers, or skin. The user can select accessories by adding accessories like collars, hats, clothes, or other decorative items. The user can select a feature such as modifying features such as eye shape, ear size, tail length, etc.

The user can select or modify the pet avatar's mood or personality settings by setting the pet's mood (e.g., happy, sad, playful) or personality traits (e.g., friendly, shy, energetic). The user can select actions or animations by choosing specific actions for the pet to perform, such as sitting, jumping, running, or playing. The user can select training commands by providing training inputs to teach the pet avatar new tricks or behaviors (e.g., "sit," "roll over").

The user can input interaction data that facilitate direct interaction between the second user and the pet avatar or between the pet avatar and other users or their pets. The user can input interactions related to feeding by selecting food items to feed the pet avatar, playing by choosing toys or activities for the pet avatar to engage in, grooming by performing grooming actions like brushing, bathing, or trimming, or communication by sending messages or commands to the pet avatar, possibly including voice inputs.

The user can input social interaction data involving the pet avatar and other users or their pets. For example, the user can input friend requests by sending or accepting friend requests on behalf of the pet avatar to interact with other pet avatars; can input gifts or rewards by sending gifts or rewards to other pet avatars; or can input events or challenges by participating in events, competitions, or challenges with other pet avatars.

The user can add maintenance inputs that involve regular maintenance or health-related actions for the pet avatar. For example, the user can input health checkups by scheduling and performing virtual health checkups or treatments, feeding schedules by setting up regular feeding schedules, or activity monitoring by tracking the pet avatar's activity levels and adjusting routines accordingly.

In a particular example, the second user, Bob, provides the following inputs to the interaction system. Bob chooses to customize his pet avatar, changing its breed to a Golden Retriever, selecting a blue collar, and adding a playful personality trait. Bob enables training of his pet avatar to perform a new trick, such as rolling over. Bob enables feeding his pet avatar pizza and salads, and then enables a toy to play fetch with. Bob enables sends a friend request to Alice's pet avatar and sends a virtual gift of a new toy. Bob schedules a virtual health checkup and sets up a daily feeding schedule for his pet avatar.

In some cases, the interaction data accesses profile data of the user to determine a customized pet avatar for the user. Profile data of users includes personal information, photos, posts, and other data as further described herein.

In some cases, a machine learning model can access such profile data to identify recommended characteristics of a pet avatar. In some cases, the machine learning model can access a user's interaction with the entire system via interaction functions to create an identity profile. The machine learning model is trained to be able to identify characteristics of a user based on the user's interaction via the interaction functions.

The system determines an initiation of an interaction function by a first user of an interaction system with a second user of the interaction system. In some examples, interaction functions include user interaction with a camera feed displayed on the user system, such as selecting a real-world object on a camera feed or selecting a digital item or overlay shown on the camera feed. In some examples, interaction functions also include a chat window where messages, stickers, emojis, and other media content items are shared between users via user systems.

Interaction functions further include sending photos or videos to friends, either individually or in groups, which are edited with text, stickers, filters, and drawings before being sent. Interaction functions include capturing a video or audio, inputting text, or other communications that disappear after certain conditions are met, such as being viewed once or setting a time limit, creating a more ephemeral and casual sharing experience.

In some examples, interaction functions include generating or viewing a collection of videos, messages, stickers, or other media content items that are visible to friends for a certain period of hours (e.g., 24 hours). Interaction functions include displaying media content items from other users, such as publishers, creators, and influencers, where users explore and subscribe to different channels to receive updates on their favorite content. Interaction functions include map and location functions, such as users sharing their location with friends and viewing their friends' locations on a map, or exploring a map with points of interest by other users categorized by location and events.

In some examples, interaction functions include generating or applying various filters and content augmentations to enhance images, videos, or other media content items to share with others, such as by adjusting the color or appearance or adding interactive elements such as animations and facial transformations, in real time. Interaction functions include saving favorite media content items with other users in a private archive, where users access these saved media content items later, edit them, or share them with friends.

Interaction functions include personalizing or applying avatars which are used as a profile picture to be viewed by others and in stickers, chat, and image/video decorations. Interaction functions include playing multiplayer games that users play with their friends directly within the user interface of the system to share messages and media content items.

Interaction functions include capturing data by an Augmented Reality (AR) device. In some examples, the interaction system captures motion and position data, such as data from accelerometers, gyroscopes, and magnetometers to track user movement or orientation. In some examples, the interaction system captures eye-tracking data that monitors the user's eye movements and focus, gaze-based interactions, objects the user is focused (or not focused) on, or user attention patterns.

In some examples, the interaction system captures facial expressions. In some examples, the interaction system captures biometric data, such as heart rate, body temperature, or skin conductivity. In some examples, the interaction system captures data related to user interactions within the virtual or augmented environment, such as objects or buttons users interact with, the time spent in specific areas, or the choices users make. In some examples, the interaction system captures voice data, voice recognition, voice commands, and/or the like. In some examples, the interaction system captures location data, such as a user's GPS location. In some examples, the interaction system captures usage data related to how and when the devices are used, session duration, frequency of use, and user engagement with specific content or applications.

In some cases, identifying the prompt for the first user includes receiving a question or request from the first user via text or speech. The interaction system identifies keywords from the prompt and applies weights to each of the identified keywords. The interaction system applies the identified keywords and corresponding weights to the second machine learning model.

In some examples, the interaction system generates the prompt for the first user automatically based on an intent identified from real-time interaction data captured by the first interaction client. The interaction system generates prompts for a user based on a user's past activity, interests, and behavior patterns. The interaction system generates personalized prompts related to topics the user may find appealing, such as if a user frequently interacts with a certain type of content about technology.

In some examples, the interaction system uses popular or trending topics from the platform or the wider internet to create prompts that are likely to be of interest to a broad audience. In some examples, by utilizing a user's geographic location, the interaction system can generate prompts that are relevant to their local area, such as events, news, or cultural topics. In some examples, the interaction system can create prompts based on the time of day, season, or upcoming events or holidays, such as events that are time sensitive. In some examples, the interaction system can use the user's social connections to generate prompts related to their friends, family, or other users they follow, such as a birthday or new connection with another user. In some examples, based on the user's activity within a specific application or AR experience, the interaction system can generate prompts related to that context.

In some examples, the interaction system can use the user's in-application actions, such as likes, comments, and shares, to generate prompts related to their interests. For example, if a user frequently interacts with content about cooking in a recipe application, the interaction system may generate a prompt for the user's favorite dish to prepare at home. In some examples, by utilizing sensors and data from the user's mobile device or AR headset, the interaction system creates context-aware prompts based on their physical environment. In some examples, the interaction system can generate prompts based on real-time events occurring within the application or AR experience, such as a live-streamed event. In some examples, the real-time interaction data includes a current camera feed from a camera system of the first interaction client.

In some examples, the interaction system uses the user's past activity, preferences, and behavior patterns within the application or AR experience to generate a prompt for the user. In some examples, the interaction system gathers user profile information, such as a calendar of appointments or objects detected in a camera feed of an AR device to generate a prompt. In some examples, by incorporating gamification elements, the interaction system creates prompts that encourage user participation and engagement, such as checking on a feature within a game.

Creating a virtual pet avatar could be based on any combination of a wide range of characteristics to make the avatar realistic, interactive, and engaging. Characteristics of the virtual pet avatar can include physical characteristics. For example, characteristics can include species such as dog, cat, bird, or reptile; breed such as specific breeds within a species, such as Golden Retriever, or Siamese cat; size such as small, medium, large; specific measurements for height and weight; or the like.

Characteristics can include color such as fur, feather, or skin color, including patterns (e.g., stripes, spots); texture such as type of fur (short, long, curly), feather type, skin texture; shape such as body shape, facial features, ear shape, tail length and type; eyes such as color, size, shape, and expressiveness; markings such as unique physical markings, such as birthmarks, scars, or distinctive patterns; or accessories such as collars, tags, clothing, hats, glasses, etc.

Characteristics of the virtual pet avatar can include behavioral characteristics. For example, characteristics can include energy level such as active, playful, lazy, calm; temperament such as friendly, shy, aggressive, curious, independent; habits such as specific behaviors like fetching, scratching, digging, climbing; preferences such as likes and dislikes, such as favorite toys, activities, or foods; intelligence such as level of smartness, ability to learn tricks or commands; or sociability such as interaction with other virtual pets or users, level of sociability.

Characteristics of the virtual pet avatar can include personality characteristics. For example, characteristics can include traits such as specific personality traits like bravery, loyalty, mischievousness, gentleness; mood such as current emotional state, which can change over time (happy, sad, excited, bored); voice/sounds such as specific sounds the pet makes, including barking, meowing, chirping; or response to user interaction such as how the pet reacts to user commands, petting, or neglect.

Characteristics of the virtual pet avatar can include health characteristics. For example, characteristics can include age such as age of the pet, which can influence other characteristics; health status such as indicators of health such as vitality, possible illnesses, or injuries; or diet and nutrition such as types of food the pet prefers or needs, feeding schedules.

Characteristics of the virtual pet avatar can include functional characteristics. For example, characteristics can include animation such as different types of movements, such as walking, running, sitting, sleeping; interactivity such as how the pet interacts with the environment, other pets, and the user; tasks and abilities such as specific functions the pet can perform, such as fetching items, solving puzzles, or performing tricks; or customization options such as ability to customize appearance and behavior based on user preferences.

Characteristics of the virtual pet avatar can include contextual characteristics. For example, characteristics can include environment interaction such as how the pet interacts with different environments, such as indoors, outdoors, virtual worlds; adaptability such as ability to adapt to different virtual environments or scenarios created by the user; or seasonal changes such as appearance and behavior changes based on virtual seasons or weather conditions.

Characteristics of the virtual pet avatar can include social and interactive characteristics. For example, characteristics can include social media integration such as ability to share pet avatars on social media platforms, interact with friends' pets; virtual companions such as interaction with other virtual pets, forming bonds or friendships; or user interaction such as specific ways the pet interacts with the user, such as responding to voice commands, touch gestures.

Characteristics of the virtual pet avatar can include advanced characteristics. For example, characteristics can include emotional intelligence such as ability to recognize and respond to the user's emotions; learning ability such as capacity to learn from user interactions and improve behavior over time; AR/VR compatibility such as ability to function and interact in augmented or virtual-reality environments; or customization from AI such as ability to evolve or change based on AI-driven insights from user interactions and preferences.

Characteristics of the virtual pet avatar can include visual and artistic characteristics. For example, characteristics can include art style such as different artistic styles for the pet avatar, such as realistic, cartoonish, pixelated; animations and expressions such as detailed animations for different expressions and actions; poses such as different poses the pet can take, enhancing the interaction and visual appeal; or backgrounds and scenes such as customizable backgrounds or scenes where the pet avatar can be placed.

FIG. 5 illustrates a pet description 502 received from the user, which can include a breed or a color of the dog. The interaction system inputs the pet description into an LLM 504 that is trained to generate a prompt. The LLM 504 can be trained to generate a prompt fitting for the generative AI 506.

The pet description 502 is provided by the user and can include specific details about the pet, such as its breed, color, size, or other distinguishing features. This pet description 502 can be collected through various means, such as a form the user fills out, voice input, or through interactions within the application. For example, the user inputs "Golden Retriever, light golden fur" as the pet description 502. This specifies the type of pet, such as a "Golden Retriever," "Persian Cat," or "African Grey Parrot." This pet description 502 also describes the color or pattern of the pet's coat, fur, feathers, or skin, like "light golden" for a dog or "striped" for a cat.

The interaction system is responsible for collecting the pet description 502 from the user and passing the user's input to the Language Model (LLM) 504. An LLM (Large Language Model) includes a type of artificial intelligence trained on vast amounts of text data to understand and generate human-like text. An LLM can process natural language inputs and produce coherent outputs based on the input data.

The LLM 504 is specifically trained to generate prompts suitable for use by generative AI 506. This training involves fine-tuning the model with data that includes pet description 502 and the corresponding prompts that guide the generative AI 506 to create accurate virtual pet avatars 510, 512, 514, and 516.

The pet description 502 received from the user is fed into the LLM 504. The LLM 504 processes this description and generates a detailed prompt that will be used by the generative AI 506 to create the virtual pet avatars 510, 512, 514, and 516. For example, the input "Golden Retriever, light golden fur" is processed by the LLM 504, which generates a detailed prompt: "Create a virtual pet avatar of a Golden Retriever with light golden fur, medium size, friendly expression, and playful behavior."

In some cases, if the prompt or the pet description 502 includes both a breed and a species of a pet avatar, the interaction system can perform checks and make decisions based on such information. If the breed does not match the species, the LLM 504 can favor the species in its generation of the prompt. If the breed matches the species, the LLM 504 can favor the breed in its generation of the prompt.

Returning to FIG. 4, at operation 406, the interaction system processes the real-life image of the pet and the prompt by a generative artificial intelligence (AI) model (e.g., generative AI 506 of FIG. 5), the generative AI model being trained to receive images and prompts and to generate virtual pet avatars based on the received images and prompts. The system can generate a virtual pet that reflects the user's personality or pet preferences. For instance, if the interaction system determines that a user is fond of energetic and playful dogs, the system applies a generative AI model, such as a stable diffusion model, to generate a virtual pet with similar characteristics.

In some cases, generating the virtual pet comprises applying the pet characteristic to a generative AI model as a prompt to receive an image of a pet. The generative AI module can be trained to generate images based on corresponding inputted prompts. The process begins by applying characteristics of the virtual pet (e.g., breed, color, size, features) as prompts to the generative AI model. These prompts serve as input instructions that guide the model in generating an image of the virtual pet.

The generative AI model can include a type of machine learning model trained to generate images based on specific input prompts. The model utilizes techniques such as deep learning and neural networks to learn patterns and features from training data.

In some cases, the generative AI model, which can include the stable diffusion model, is trained using a dataset of pet images. This dataset provides the model with a diverse range of pet characteristics, appearances, and variations to learn from. The stable diffusion model introduces noise iteratively to update pixel values in a generated image based on neighboring pixels. This iterative process refines the image generation by gradually adjusting pixel values to create realistic and detailed images.

During the image generation process, the stable diffusion model introduces noise, which represents small random variations in pixel values. This noise helps the model explore different possibilities and create diverse variations of the virtual pet image. The model iteratively updates pixel values based on neighboring pixels and the introduced noise. This iterative refinement process contributes to generating high-quality and visually appealing images of the virtual pet.

As the stable diffusion model iteratively refines pixel values based on the input prompts and noise, the model generates an image of the virtual pet. The output image reflects the characteristics and features specified in the prompts, such as the pet's breed, color patterns, facial expressions, and other details.

In some examples, the interaction system selects from preconfigured pet avatars. The interaction system allows users to select from a range of preconfigured pet avatars. These preconfigured avatars are designed with specific characteristics and attributes, such as appearance, personality traits, and predefined behaviors. The preconfigured avatars ensure a diverse and appealing selection, catering to various user preferences and enhancing the user experience. By providing a curated set of pet avatars, the system simplifies the selection process, enabling users to quickly choose a pet that aligns with their desired aesthetic and interactive qualities.

These preconfigured pet avatars can include a variety of animal types, such as dogs, cats, cows, pandas, and more exotic animals, each with unique visual and behavioral traits. For instance, a preconfigured dog avatar might come with options for different breeds, colors, and accessories, while also exhibiting behaviors typical of its breed, such as playful energy or loyalty. This approach not only streamlines the customization process but also ensures that the pet avatars are well-designed and functionally consistent, providing users with an engaging and enjoyable experience as they interact with their virtual pets within the application.

Returning to FIG. 4, at operation 408, the interaction system receives a virtual pet avatar from the generative AI model. The virtual pet avatar can be in the form of a media content item. Media content items include:

- Content augmentations to enhance images, videos, or other media content items to share with others, such as by adjusting the color or appearance or adding interactive elements such as animations and facial transformations, in real time.
- Emojis that are small images or icons that represent emotions, reactions, or objects.
- Stickers that are larger images or animations that can be sent in a chat window.
- Images or photographs that can be sent to other users to share visual information or document a particular event.
- Video clips that can be used to share recorded content or document a particular event.
- Audio messages that can be shared to communicate audible communication.
- Graphics Interchange Formats (GIFs) that are short animations that can be used to add humor or express emotions.

The interaction system can iteratively generate virtual pet avatars, such as virtual pet avatars 510, 512, 514, and 516 in FIG. 5. As further described herein, the iteratively generated virtual pet avatars can be generated using the same input to the generative AI 506, modified inputs to the generative AI 506, iteratively running the LLM 504 using the same input to generate different versions of prompts, or modifying the inputs to the LLM 504 to generate different versions of the prompts (as further described herein).

The interaction system can leverage generated virtual pets created from saved prompts in various creative and engaging ways. Users can add their virtual pets as overlays in their photos or videos before posting. The virtual pet can appear to interact with real-life elements in the scene. Users can create stories featuring their virtual pets performing actions, such as playing, eating, or reacting to the user's activities. For example, a user posts a video of their virtual dog fetching a ball thrown in a park.

Users can create separate profiles for their virtual pets, sharing their adventures, activities, and interactions as if the pet has its own social media presence. The pet's profile can display a timeline of its activities, interactions, and milestones. For example, the interaction system can create a dedicated account for a user's virtual hamster, featuring daily updates and stories. Users can also include their virtual pets into their already existing profiles.

Users can host live streams featuring their virtual pets, where viewers can interact by sending commands or virtual gifts to the pet. The interaction system can generate virtual pet shows or Q&A sessions where the pet "answers" viewer questions through pre-programmed responses.

The interaction system can generate virtual clubs or groups users can join based on their virtual pet's species or breed. These communities can share tips, participate in events, and showcase their pets. The interaction system can generate group activities like virtual pet meet-ups, playdates, or group challenges.

The interaction system can generate customizable stickers of the user's virtual pet that can be used in messaging apps within the social media platform. The interaction system can generate dynamic pet emojis that express different emotions or reactions based on the user's virtual pet. For example, a user sends a sticker of their virtual cat with a heart emoji in a chat conversation.

The interaction system can generate personalized recommendations, such as videos, articles, or groups, based on the characteristics and activities of the user's virtual pet. The interaction system can generate personalized product recommendations for virtual pet accessories, real-life pet products, or related digital content. For example, the interaction system can generate recommendations for virtual dog toys or training videos based on the user's interaction with their virtual pet.

In some cases, the interaction system saves an LLM-generated prompt for use in other interaction functions. The output of the LLM 504 can be inputted into other interaction functions 518 with their own generative AI. The prompt generated by the LLM 504 can be saved in a structured database, allowing for easy retrieval and reuse. Each prompt can be tagged with relevant metadata, such as the user's ID, the type of pet, and the date it was created. For example, the interaction system can store the prompt "Create a virtual pet avatar of a Golden Retriever with light golden fur, medium size, friendly expression, and playful behavior" in a database with metadata tags.

The interaction system can use the prompt for other interaction functions, such as AR/VR applications. The interaction system can use the saved prompt to generate non-playable characters NPCs in AR/VR environments. The prompt provides detailed characteristics that help in creating lifelike and interactive NPCs. For example, in an AR game, the prompt helps create a friendly Golden Retriever NPC that can interact with players, follow them, and perform actions like fetching virtual objects.

The prompt can be used to script behaviors and interactions for the NPC. This includes defining how the NPC reacts to user actions and environmental changes. For example, the Golden Retriever NPC exhibits playful behavior, follows the player around the virtual park, and reacts positively when the player gives virtual treats.

In some cases, the interaction system can use the prompt to generate characters that appear in AR through wearables like glasses or headsets. These characters can interact with the real-world environment. When wearing AR glasses, the user can see the virtual Golden Retriever running around their living room, interacting with real objects like jumping onto a couch.

The characters generated from the prompt can interact in real time based on user movements and commands, enhancing the immersive experience. The Golden Retriever NPC follows the user's gaze and responds to voice commands, creating a more immersive AR experience.

The interaction system can use the prompt to create a content augmentation that overlays a virtual pet onto the real-world video stream captured by the user's camera. The content augmentation uses the characteristics from the prompt to ensure the virtual pet matches the user's description. For example, the interaction system can generate a content augmentation that places a virtual Golden Retriever with light golden fur into the user's real-world environment over a real-world pet as seen through the camera.

The interaction system can use the prompt to guide the creation of animations and interactive elements for the content augmentation, making the virtual pet behave naturally within the real-world context. The virtual Golden Retriever in the content augmentation wags its tail, barks happily, and follows the user's movements within the camera view.

Using the saved prompt, the system can create personalized content augmentation for each user, reflecting their unique pet descriptions and preferences. Each user gets a content augmentation that features their specific virtual pet, like a Golden Retriever for one user and a Siamese cat for another, based on their respective prompts.

Even if the prompts are the same, the interaction system applies a separate generative AI model for the original user and another generative AI for the other interaction function, which results in a similar but different virtual pet.

The prompt can be used to create avatars for virtual pets in online games and virtual worlds, allowing users to bring their pets into different digital experiences. The virtual Golden Retriever can be imported into a virtual world, where the virtual pet interacts with other avatars and participates in virtual activities.

By saving and utilizing the prompts generated by the LLM, the interaction system can create a wide range of virtual characters and experiences, enhancing user engagement and personalization across various digital platforms.

Systems and methods described herein include training a machine learning network, such as training to generate pet avatars or transform avatars. The machine learning network can be trained to receive characteristics of pet avatars, as further described herein, and automatically generate custom pet avatars that have never been seen or created before. The machine learning algorithm can be trained using historical information that include historical pet characteristics and resulting pet avatars.

Training of models, such as artificial intelligence models, is necessarily rooted in computer technology, and improves modeling technology by using training data to train such models and thereafter applying the models to new inputs to make inferences on the new inputs. Here, the new inputs can be brand-new pet characteristics. The trained machine learning model can generate brand-new pet avatars from the combination of pet characteristics.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new pet characteristics data) and make predictions that the model was trained for based on the weights or scores that were adjusted during training. Such training of the machine learning models described herein reduces false positives and increases the performance of the models.

Removal of Background

Figure 6:
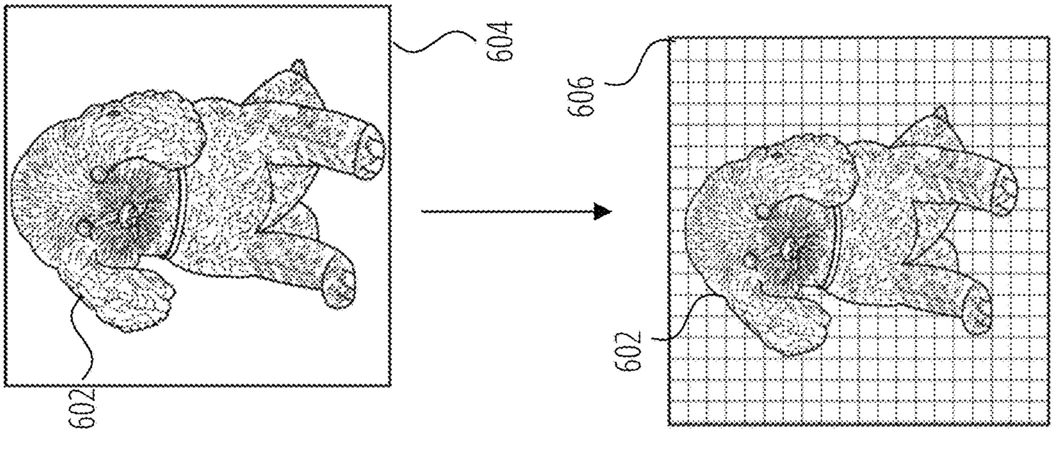
FIG. 6 illustrates an example of the removal of a background for the virtual pet avatar, according to some examples.

FIG. 6 illustrates an example of the removal of a background for the virtual pet avatar, according to some examples. To enable the use of a virtual pet avatar across multiple interaction functions, the interaction system removing the background from the generated virtual pet avatar is crucial. This process ensures the avatar can be seamlessly integrated into various environments and applications, such as AR lenses, social media posts, and virtual worlds.

When the generative AI creates a virtual pet avatar, the virtual pet avatar 602 might include a background 604 and the virtual pet avatar 602 itself, especially if the interaction system uses complex scenes or environments for rendering. The interaction system separates the virtual pet avatar 602 from its background 604, to create the virtual pet avatar 602 image without the background 606.

The interaction system can apply image segmentation by dividing an image into different segments, each representing a distinct object or region. For background removal, segmentation focuses on identifying the pet and separating it from the background. The generative AI can use deep learning models trained on datasets of pets and backgrounds.

The generated image of the virtual pet avatar with background is fed into the segmentation model. The model processes the image, identifying the pet as the foreground and the rest as the background. A binary mask is created where the pet region is marked, and the background is marked for removal. An image of the pet with the background removed is generated.

In some cases, the interaction system removes the background using chroma keying by placing the pet in front of a solid color background (typically green or blue) during the generation phase, which can be easily removed later. During the generation, the pet is rendered against a green screen. The interaction function then removes this solid color background.

The generative AI creates the pet avatar against a solid green or blue background. The interaction function applies chroma keying to remove the solid color background, leaving only the pet. Then a clean pet avatar with no background is generated.

Once the background is removed, the virtual pet avatar can be used across different platforms and applications seamlessly. The transparent pet avatar can be placed into real-world environments using AR technology. Users can interact with the pet as it appears to be in their physical space. Users can add the transparent pet avatar to their photos or videos without worrying about background inconsistencies. The pet avatar can be imported into virtual worlds or games as an NPC, interacting naturally within different environments. The transparent pet avatar can be turned into custom stickers or emojis for use in messaging apps, enhancing user communication.

Multiple Pet Generation

Figure 7:
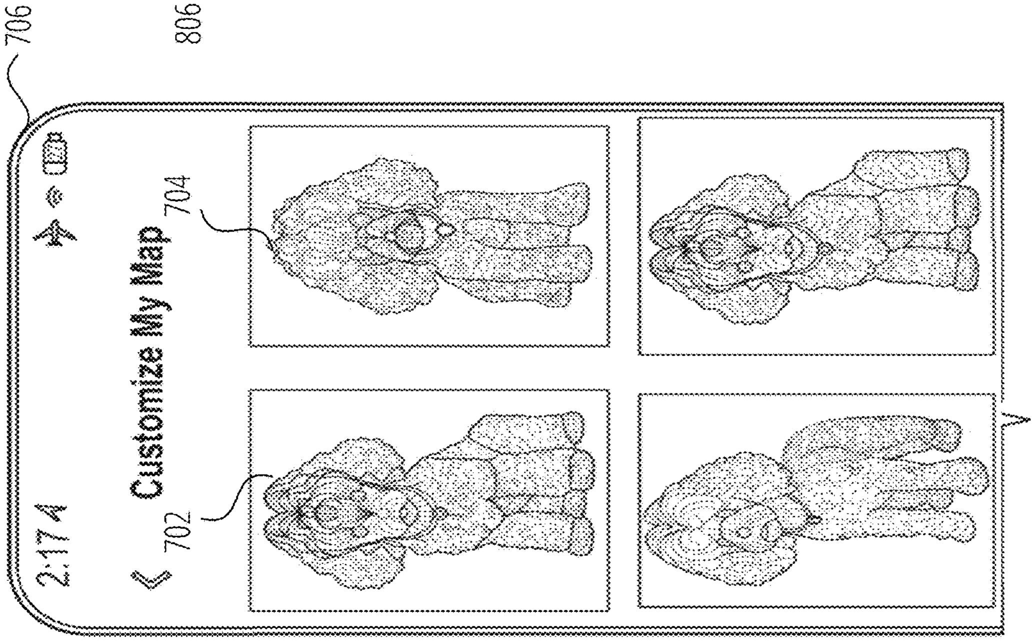
FIG. 7 illustrates multiple pet avatar versions generated by the same prompt and real life image of a pet, according to some examples.

FIG. 7 illustrates multiple pet avatar versions generated by the same prompt and real-life image of a pet, according to some examples. To enhance user engagement and provide a personalized experience, the generative AI can be designed to create multiple versions of the virtual pet avatar based on the same prompt and real-life pet image, such as a first version 702 and a second version 704 of a virtual pet avatar.

A user interface 706 can enable users to choose their preferred version from a set of variations. The generative AI model receives the real-life pet image and the prompt and processes these inputs to generate a virtual pet avatar.

To create multiple versions, the model is run iteratively. In some cases, the same prompt and real-life pet image is applied. In other cases, the interaction system introduces slight variations in each run, such as by running the LLM iteratively using the same input pet descriptions or by slightly varying such descriptions. These variations can be controlled by adjusting parameters within the AI model; for example, a random seed that applies different random seeds can be used to introduce variability; style-related parameters can be adjusted, like color tones, textures, and specific features; or behavior changes and animation using variations in the pet's posture, facial expressions, and animations. Each run of the model generates a different version of the virtual pet avatar while maintaining core characteristics from the prompt and the real-life image. For example, for a prompt describing a friendly Golden Retriever, different versions may vary in fur texture, shades of golden color, expressions (e.g., smiling, playful), and slight changes in body posture.

The generated versions are presented to the user through an interactive interface. This interface can be part of a mobile app, web application, or AR/VR platform. Users can preview each version in various contexts, such as in a static image, a short animation, or an AR environment. Users can compare versions side by side to see differences more clearly. Users can zoom in on each version to inspect details like fur texture, eye color, and facial expressions.

Once the user selects their preferred version, the system confirms the choice. The selected version is saved to the user's profile and can be integrated into various interaction functions.

Figure 8:
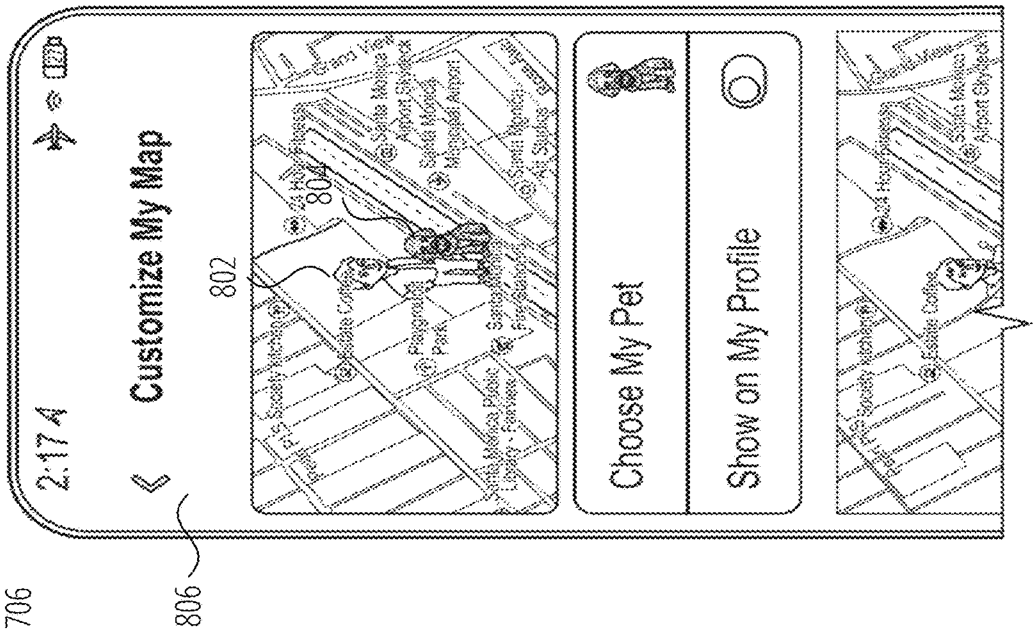
FIG. 8 illustrates an example of a pet avatar displayed on a map with the user's avatar, according to some examples.

FIG. 8 illustrates an example of a pet avatar displayed on a map with the user's avatar, according to some examples. The user interface 806 displays a map where a user's avatar 802 is displayed with the pet avatar 804. In some cases, the location of the avatars is the current location of the user or a designated location (e.g., home, past visited, past post location).

By allowing the generative AI to produce multiple versions of the virtual pet avatar and inviting the user to select their preferred one, the system ensures a high level of personalization and user satisfaction, making the virtual pet a more integral and enjoyable part of the user's digital life.

Data Communications Architecture

Figure 9:
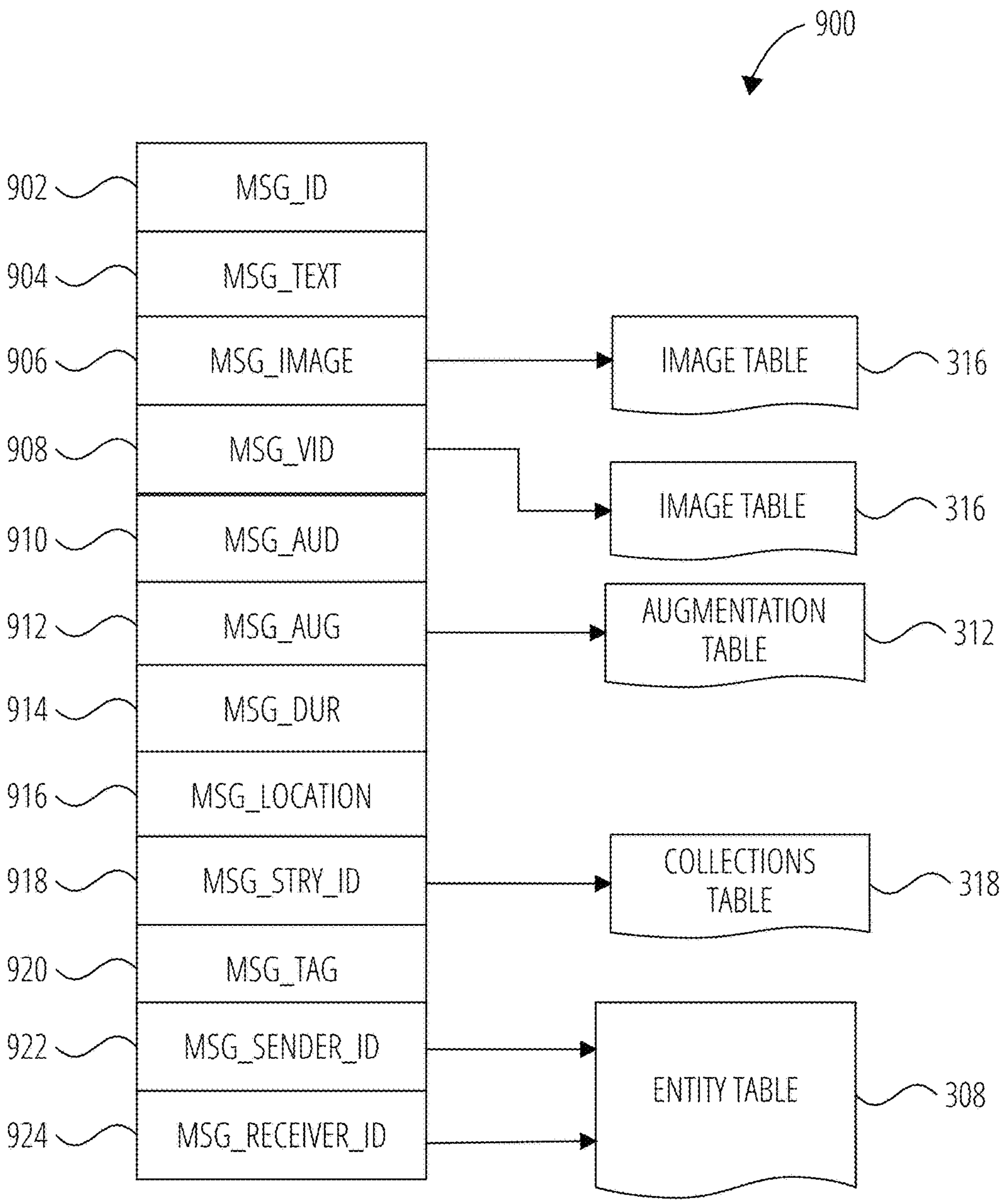
FIG. 9 is a diagrammatic representation of a message, according to some examples.

FIG. 9 is a schematic diagram illustrating a structure of a message 900, according to some examples, generated by an interaction client 104 for communication to a further interaction client 104 via the interaction servers 124. The content of a particular message 900 is used to populate the message table 306 stored within the database 304, accessible by the interaction servers 124. Similarly, the content of a message 900 is stored in memory as "in-transit" or "in-flight" data of the user system 102 or the interaction servers 124. A message 900 is shown to include the following example components:

- Message identifier 902: a unique identifier that identifies the message 900.
- Message text payload 904: text, to be generated by a user via a user interface of the user system 102, and that is included in the message 900.
- Message image payload 906: image data, captured by a camera component of a user system 102 or retrieved from a memory component of a user system 102, and that is included in the message 900. Image data for a sent or received message 900 may be stored in the image table 316.
- Message video payload 908: video data, captured by a camera component or retrieved from a memory component of the user system 102, and that is included in the message 900. Video data for a sent or received message 900 may be stored in the image table 316.
- Message audio payload 910: audio data, captured by a microphone or retrieved from a memory component of the user system 102, and that is included in the message 900.
- Message augmentation data 912: augmentation data (e.g., filters, stickers, or other annotations or enhancements) that represents augmentations to be applied to message image payload 906, message video payload 908, or message audio payload 910 of the message 900. Augmentation data for a sent or received message 900 may be stored in the augmentation table 312.
- Message duration parameter 914: parameter value indicating, in seconds, the amount of time for which content of the message (e.g., the message image payload 906, message video payload 908, message audio payload 910) is to be presented or made accessible to a user via the interaction client 104.
- Message geolocation parameter 916: geolocation data (e.g., latitudinal and longitudinal coordinates) associated with the content payload of the message. Multiple message geolocation parameter 916 values may be included in the payload, each of these parameter values being associated with respect to content items included in the content (e.g., a specific image within the message image payload 906, or a specific video in the message video payload 908).
- Message story identifier 918: identifier values identifying one or more content collections (e.g., "stories" identified in the collections table 318) with which a particular content item in the message image payload 906 of the message 900 is associated. For example, multiple images within the message image payload 906 may each be associated with multiple content collections using identifier values.
- Message tag 920: each message 900 may be tagged with multiple tags, each of which is indicative of the subject matter of content included in the message payload. For example, where a particular image included in the message image payload 906 depicts an animal (e.g., a lion), a tag value may be included within the message tag 920 that is indicative of the relevant animal. Tag values may be generated manually, based on user input, or may be automatically generated using, for example, image recognition.
- Message sender identifier 922: an identifier (e.g., a messaging system identifier, email address, or device identifier) indicative of a user of the user system 102 on which the message 900 was generated and from which the message 900 was sent.
- Message receiver identifier 924: an identifier (e.g., a messaging system identifier, email address, or device identifier) indicative of a user of the user system 102 to which the message 900 is addressed.

The contents (e.g., values) of the various components of message 900 may be pointers to locations in tables within which content data values are stored. For example, an image value in the message image payload 906 may be a pointer to (or address of) a location within an image table 316. Similarly, values within the message video payload 908 may point to data stored within an image or video table 316, values stored within the message augmentation data 912 may point to data stored in an augmentation table 312, values stored within the message story identifier 918 may point to data stored in a collections table 318, and values stored within the message sender identifier 922 and the message receiver identifier 924 may point to user records stored within an entity table 308.

System with Head-Wearable Apparatus

Figure 10:
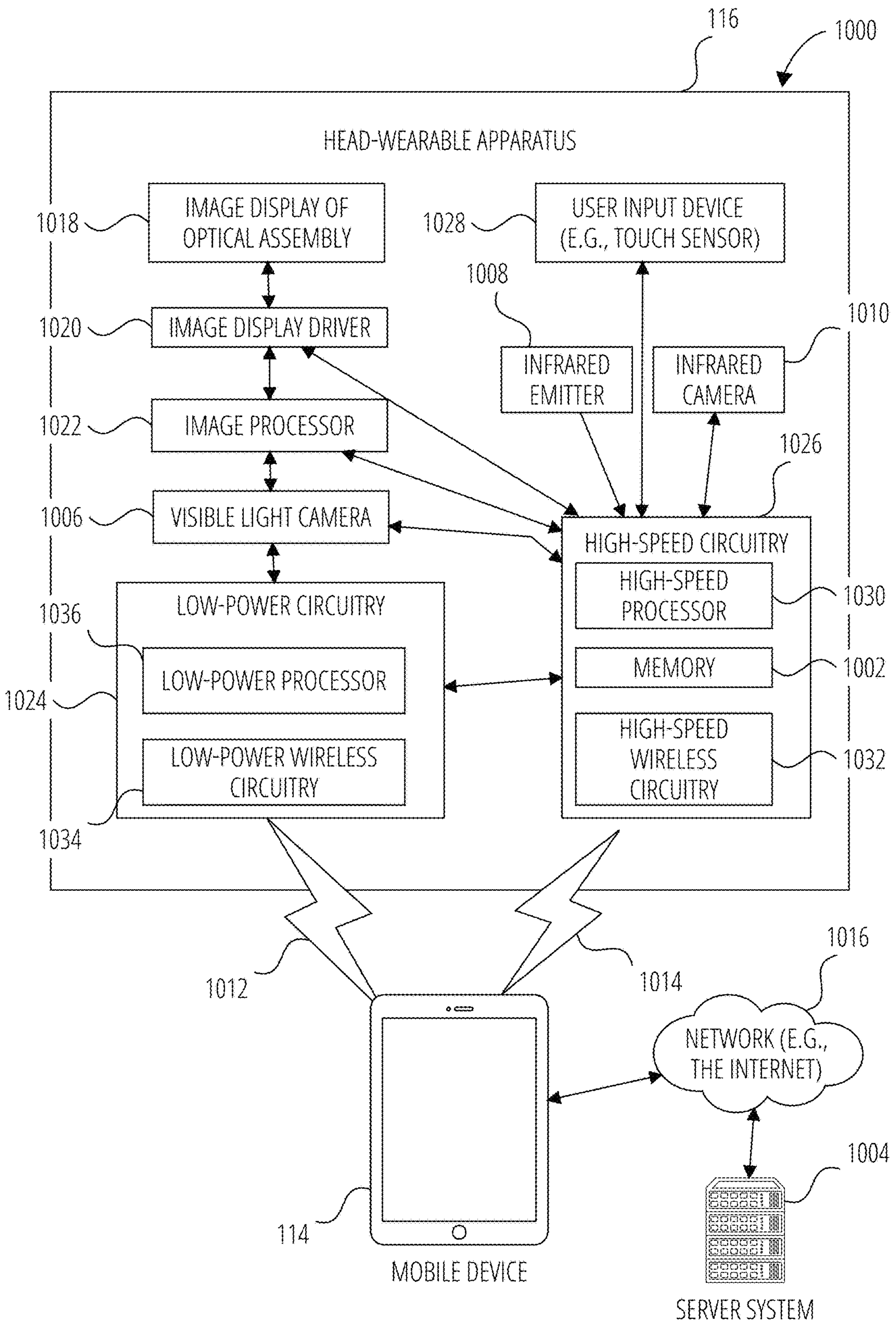
FIG. 10 illustrates a system including a head-wearable apparatus with a selector input device, according to some examples.

FIG. 10 illustrates a system 1000 including a head-wearable apparatus 116 with a selector input device, according to some examples. FIG. 10 is a high-level functional block diagram of an example head-wearable apparatus 116 communicatively coupled to a mobile device 114 and various server systems 1004 (e.g., the interaction server system 110) via various networks 108. The networks 108 may include any combination of wired and wireless connections.

The head-wearable apparatus 116 includes one or more cameras, each of which may be, for example, a visible light camera 1006, an infrared emitter 1008, and an infrared camera 1010.

An interaction client, such as a mobile device 114 connects with head-wearable apparatus 116 using both a low-power wireless connection 1012 and a high-speed wireless connection 1014. The mobile device 114 is also connected to the server system 1004 and the network 1016.

The head-wearable apparatus 116 further includes two image displays of the image display of optical assembly 1018. The two image displays of optical assembly 1018 include one associated with the left lateral side and one associated with the right lateral side of the head-wearable apparatus 116. The head-wearable apparatus 116 also includes an image display driver 1020, an image processor 1022, low-power circuitry 1024, and high-speed circuitry 1026. The image display of optical assembly 1018 is for presenting images and videos, including an image that can include a graphical user interface to a user of the head-wearable apparatus 116.

The image display driver 1020 commands and controls the image display of optical assembly 1018. The image display driver 1020 may deliver image data directly to the image display of optical assembly 1018 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1028 (e.g., touch sensor or push button), including an input surface on the head-wearable apparatus 116. The user input device 1028 (e.g., touch sensor or push button) is to receive from the user an input selection to manipulate the graphical user interface of the presented image.

The components shown in FIG. 10 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1002, which stores instructions to perform a subset or all of the functions described herein. The memory 1002 can also include storage device.

As shown in FIG. 10, the high-speed circuitry 1026 includes a high-speed processor 1030, a memory 1002, and high-speed wireless circuitry 1032. In some examples, the image display driver 1020 is coupled to the high-speed circuitry 1026 and operated by the high-speed processor 1030 in order to drive the left and right image displays of the image display of optical assembly 1018. The high-speed processor 1030 may be any processor capable of managing high-speed communications and operation of any general computing system needed for the head-wearable apparatus 116. The high-speed processor 1030 includes processing resources needed for managing high-speed data transfers on a high-speed wireless connection 1014 to a wireless local area network (WLAN) using the high-speed wireless circuitry 1032. In certain examples, the high-speed processor 1030 executes an operating system such as a LINUX operating system or other such operating system of the head-wearable apparatus 116, and the operating system is stored in the memory 1002 for execution. In addition to any other responsibilities, the high-speed processor 1030 executing a software architecture for the head-wearable apparatus 116 is used to manage data transfers with high-speed wireless circuitry 1032. In certain examples, the high-speed wireless circuitry 1032 is configured to implement Institute of Electrical and Electronic Engineers (IEEE) 802.11 communication standards, also referred to herein as WI-FI®. In some examples, other high-speed communications standards may be implemented by the high-speed wireless circuitry 1032.

The low-power wireless circuitry 1034 and the high-speed wireless circuitry 1032 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1012 and the high-speed wireless connection 1014, may be implemented using details of the architecture of the head-wearable apparatus 116, as can other elements of the network 1016.

The memory 1002 includes any storage device capable of storing various data and applications, including, among other things, camera data generated by the left and right visible light cameras 1006, the infrared camera 1010, and the image processor 1022, as well as images generated for display by the image display driver 1020 on the image displays of the image display of optical assembly 1018. While the memory 1002 is shown as integrated with high-speed circuitry 1026, in some examples, the memory 1002 may be an independent standalone element of the head-wearable apparatus 116. In certain such examples, electrical routing lines may provide a connection through a chip that includes the high-speed processor 1030 from the image processor 1022 or the low-power processor 1036 to the memory 1002. In some examples, the high-speed processor 1030 may manage addressing of the memory 1002 such that the low-power processor 1036 will boot the high-speed processor 1030 any time that a read or write operation involving memory 1002 is needed.

As shown in FIG. 10, the low-power processor 1036 or high-speed processor 1030 of the head-wearable apparatus 116 can be coupled to the camera (visible light camera 1006, infrared emitter 1008, or infrared camera 1010), the image display driver 1020, the user input device 1028 (e.g., touch sensor or push button), and the memory 1002.

The head-wearable apparatus 116 is connected to a host computer. For example, the head-wearable apparatus 116 is paired with the mobile device 114 via the high-speed wireless connection 1014 or connected to the server system 1004 via the network 1016. The server system 1004 may be one or more computing devices as part of a service or network computing system, for example, that includes a processor, a memory, and network communication interface to communicate over the network 1016 with the mobile device 114 and the head-wearable apparatus 116.

The mobile device 114 includes a processor and a network communication interface coupled to the processor. The network communication interface allows for communication over the network 1016, low-power wireless connection 1012, or high-speed wireless connection 1014. Mobile device 114 can further store at least portions of the instructions in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1020. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1004, such as the user input device 1028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1012 and high-speed wireless connection 1014 from the mobile device 114 via the low-power wireless circuitry 1034 or high-speed wireless circuitry 1032.

Machine Architecture

Figure 11:
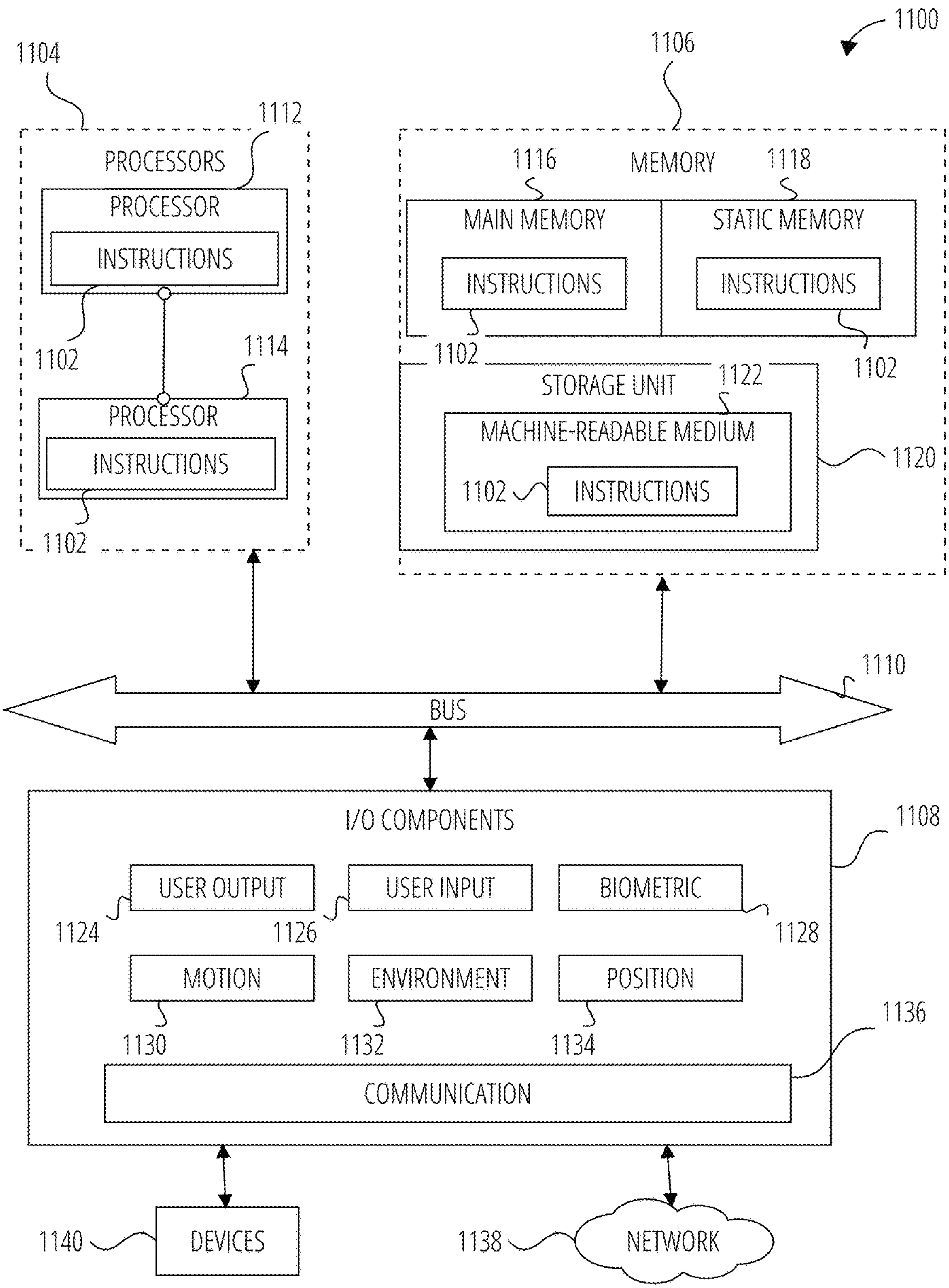
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1130 include acceleration sensor components (e.g., accelerometer), gravitation sensor components, rotation sensor components (e.g., gyroscope).

The environmental components 1132 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
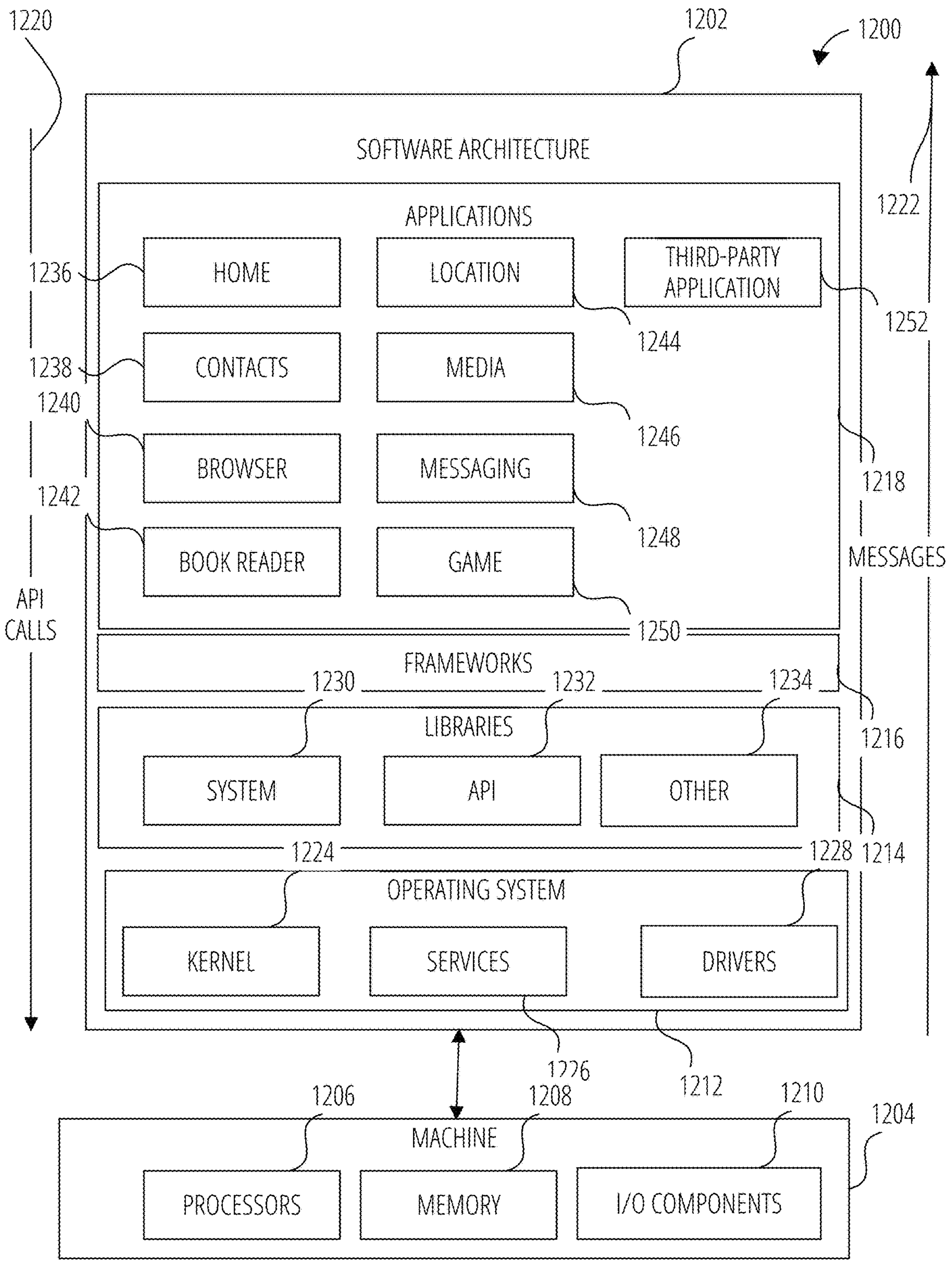
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 1252 can invoke the API calls 1220 provided by the operating system 1212 to facilitate functionalities described herein.

Machine-Learning Pipeline

Figure 14:
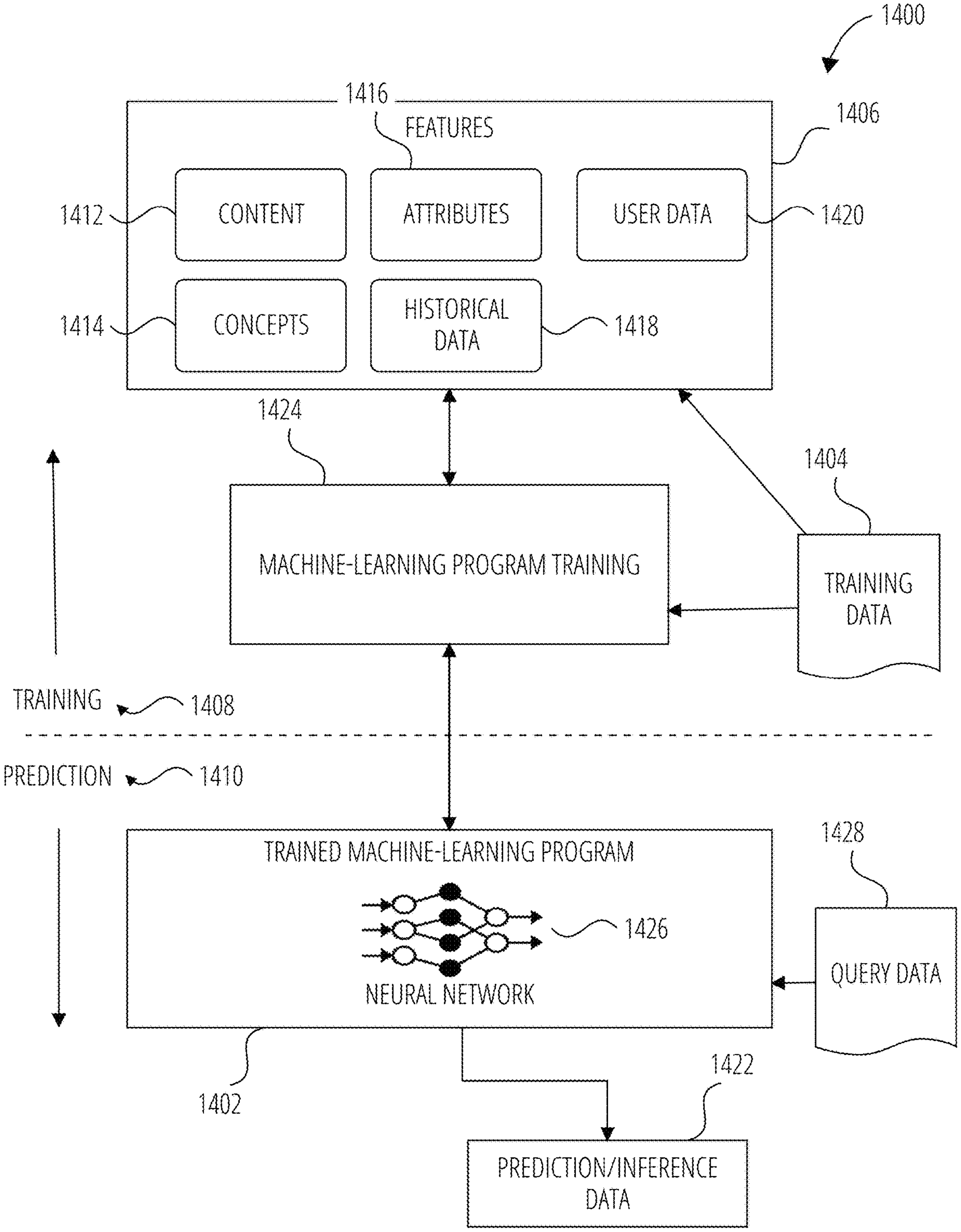
FIG. 14 illustrates training and use of a machine-learning program, according to some examples.

FIG. 14 is a flowchart depicting a machine-learning pipeline 1400, according to some examples. The machine-learning pipelines 1400 may be used to generate a trained model, for example the trained machine-learning program 1402 of FIG. 14, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 13:
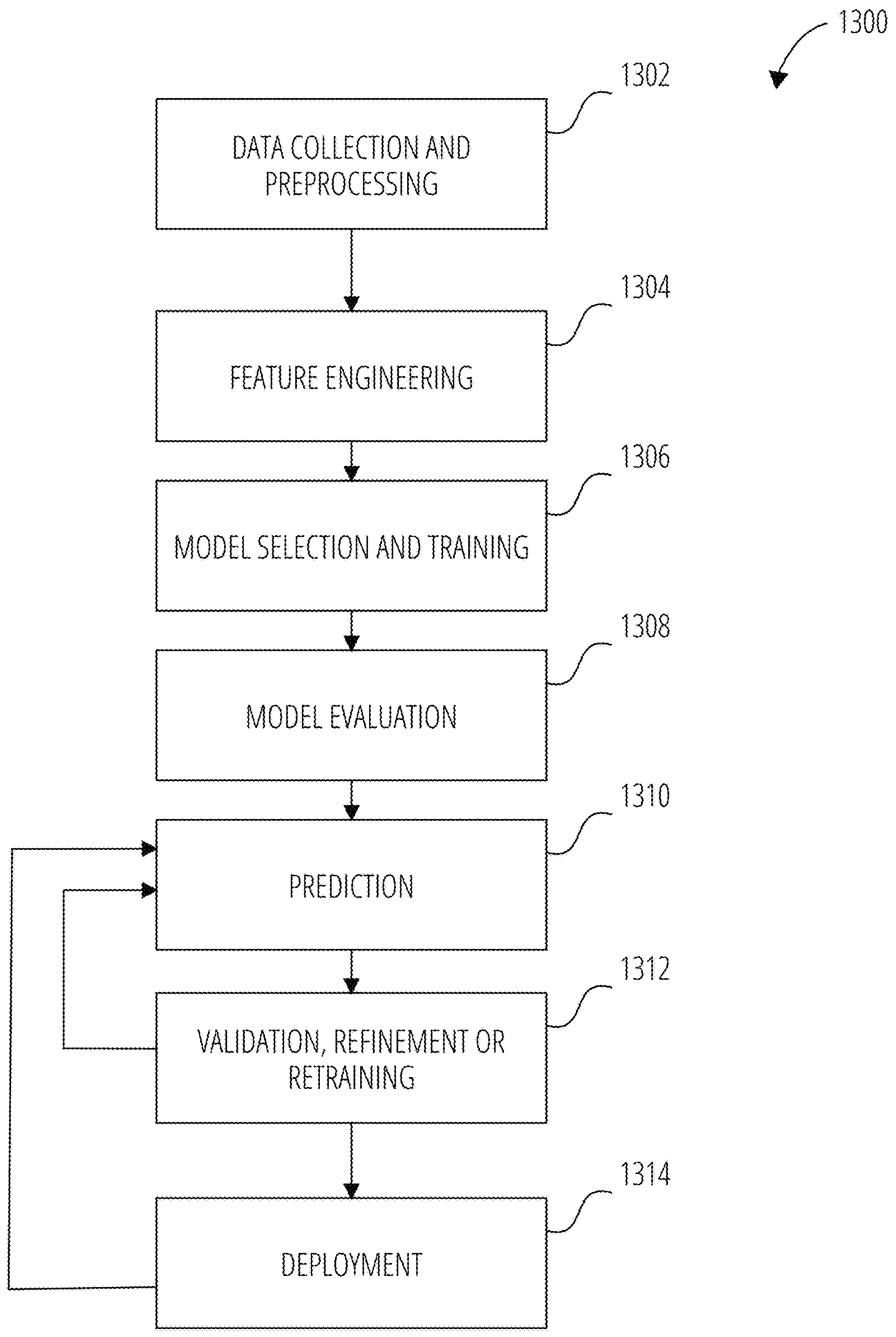
FIG. 13 illustrates a machine-learning pipeline, according to some examples.

Generating a trained machine-learning program 1402 may include multiple types of phases that form part of the machine-learning pipeline 1400, including for example the following phases 1300 illustrated in FIG. 13:

- Data collection and preprocessing 1302: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.
- Feature engineering 1304: This may include selecting and transforming the training data 1404 to create features that are useful for predicting the target variable. Feature engineering may include (1) receiving features 1406 (e.g., as structured or labeled data in supervised learning) and/or (2) identifying features 1406 (e.g., unstructured or unlabeled data for unsupervised learning) in training data 1404.
- Model selection and training 1306: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.
- Model evaluation 1308: This may include evaluating the performance of a trained model (e.g., the trained machine-learning program 1402) on a separate testing dataset. This can help determine if the model is overfitting or underfitting and if it is suitable for deployment.
- Prediction 1310: This involves using a trained model (e.g., trained machine-learning program 1402) to generate predictions on new, unseen data.
- Validation, refinement or retraining 1312: This may include updating a model based on feedback generated from the prediction phase, such as new data or user feedback.
- Deployment 1314: This may include integrating the trained model (e.g., the trained machine-learning program 1402) into a larger system or application, such as a web service, mobile app, or IoT device. This can involve setting up APIs, building a user interface, and ensuring that the model is scalable and can handle large volumes of data.

FIG. 14 illustrates two example phases, namely a training phase 1408 (part of the model selection and trainings 1306) and a prediction phase 1410 (part of prediction 1310). Prior to the training phase 1408, feature engineering 1304 is used to identify features 1406. This may include identifying informative, discriminating, and independent features for the effective operation of the trained machine-learning program 1402 in pattern recognition, classification, and regression. In some examples, the training data 1404 includes labeled data, which is known data for pre-identified features 1406 and one or more outcomes.

Each of the features 1406 may be a variable or attribute, such as individual measurable property of a process, article, system, or phenomenon represented by a data set (e.g., the training data 1404). Features 1406 may also be of different types, such as numeric features, strings, vectors, matrices, encodings, and graphs, and may include one or more of content 1412, concepts 1414, attributes 1416, historical data 1418 and/or user data 1420, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1408, the machine-learning pipeline 1400 uses the training data 1404 to find correlations among the features 1406 that affect a predicted outcome or prediction/inference data 1422.

With the training data 1404 and the identified features 1406, the trained machine-learning program 1402 is trained during the training phase 1408 during machine-learning program training 1424. The machine-learning program training 1424 appraises values of the features 1406 as they correlate to the training data 1404. The result of the training is the trained machine-learning program 1402 (e.g., a trained or learned model).

Further, the training phase 1408 may involve machine learning, in which the training data 1404 is structured (e.g., labeled during preprocessing operations), and the trained machine-learning program 1402 implements a relatively simple neural network 1426 capable of performing, for example, classification and clustering operations. In other examples, the training phase 1408 may involve deep learning, in which the training data 1404 is unstructured, and the trained machine-learning program 1402 implements a deep neural network 1426 that is able to perform both feature extraction and classification/clustering operations.

A neural network 1426 may, in some examples, be generated during the training phase 1408, and implemented within the trained machine-learning program 1402. The neural network 1426 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1426 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1426 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1408, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1426 is iteratively trained by adjusting model parameters to minimize a specific loss function or maximize a certain objective. The system can continue to train the neural network 1426 by adjusting parameters based on the output of the validation, refinement, or retraining block 1312, and rerun the prediction 1310 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1426 even after deployment 1314 of the neural network 1426. The neural network 1426 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1410, the trained machine-learning program 1402 uses the features 1406 for analyzing query data 1428 to generate inferences, outcomes, or predictions, as examples of a prediction/inference data 1422. For example, during prediction phase 1410, the trained machine-learning program 1402 is used to generate an output. Query data 1428 is provided as an input to the trained machine-learning program 1402, and the trained machine-learning program 1402 generates the prediction/inference data 1422 as output, responsive to receipt of the query data 1428. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 1402 may be a generative AI model. Generative AI is a term that may refer to any type of artificial intelligence that can create new content from training data 1404. For example, generative AI can produce text, images, video, audio, code or synthetic data that are similar to the original data but not identical.

Some of the techniques that may be used in generative AI are:

Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.

Recurrent Neural Networks (RNNs): RNNs are designed for processing sequential data, such as speech, text, and time series data.

They have feedback loops that allow them to capture temporal dependencies and remember past inputs. RNNs may be used in applications such as speech recognition, machine translation, and sentiment analysis Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.

Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1422 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, cause the at least one processor to perform operations comprising: receiving, by a computing device of a first user, a real life image of a pet; identifying a prompt corresponding to desired characteristics of a first virtual pet avatar for the first user; processing the real life image of the pet and the prompt by a first generative Artificial Intelligence (AI) model, the first generative AI model being trained to receive images and prompts and to generate virtual pet avatars based on the received images and prompts; and receiving a first virtual pet avatar from the first generative AI model.

In Example 2, the subject matter of Example 1 includes, wherein receiving the real life image includes receiving an image captured by a camera of the computing device of the first user.

In Example 3, the subject matter of Examples 1-2 includes, wherein receiving the real life image includes identifying a friend of the first user, identifying an image uploaded by the friend of the first user, determining that the image includes a real life pet, determining that the first user reacted to the uploaded image, and identifying the real life pet as the real life image of the pet.

In Example 4, the subject matter of Examples 1-3 includes, generating the prompt based on one or more preferences for the first virtual pet avatar from the first user.

In Example 5, the subject matter of Example 4 includes, wherein generating the prompt comprises inputting the one or more preferences for the first virtual pet avatar to a large language model (LLM) to generate the prompt, the LLM trained to receive as input pet preferences and outputting prompts corresponding to the input pet preferences.

In Example 6, the subject matter of Example 5 includes, wherein the LLM is trained to generate prompts configured to be received as input by the first generative AI model.

In Example 7, the subject matter of Examples 5-6 includes, applying the LLM-generated prompt to a first interaction function, the first interaction function being different than a second interaction function associated with the first virtual pet avatar, the first interaction function including a second generative AI model, an application of the LLM-generated prompt to the first interaction function causing the second generative AI model to generate a second virtual pet avatar, the second virtual pet avatar being different than the first virtual pet avatar.

In Example 8, the subject matter of Example 7 includes, wherein the first interaction function includes an XR application for a wearable device, and the second virtual pet avatar is displayed over a real-world environment.

In Example 9, the subject matter of Examples 7-8 includes, wherein the first interaction function includes a content augmentation that overlays the second virtual pet avatar over a real world pet on a real-world video stream.

In Example 10, the subject matter of Examples 4-9 includes, identifying the one or more preferences for the first virtual pet avatar based on interaction data by the first user with an interaction function.

In Example 11, the subject matter of Examples 1-10 includes, wherein the first generative AI model comprises a stable diffusion model configured to receive the real life image and the prompt to generate the first virtual pet avatar.

In Example 12, the subject matter of Examples 1-11 includes, wherein the first virtual pet avatar comprises a three-dimensional media content item configured to perform one or more animated actions.

In Example 13, the subject matter of Example 12 includes, wherein the first generative AI model is configured to generate the first virtual pet avatar to perform the one or more animated actions based on a personality trait within the prompt.

In Example 14, the subject matter of Examples 1-13 includes, removing a background of the first virtual pet avatar to generate a modified virtual pet avatar, and applying the modified virtual pet avatar to one or more interaction functions.

In Example 15, the subject matter of Examples 1-14 includes, applying the prompt and the real life image iteratively to the first generative AI model to generate at least a first and second version of the first virtual pet avatar, and receiving a selection from a user of the first version of the first virtual pet avatar.

In Example 16, the subject matter of Examples 1-15 includes, modifying the prompt to create first and second versions of the prompt; and applying the first and second versions of the prompt and the real life image iteratively to the first generative AI model to generate at least a first and second version of the first virtual pet avatar, and receiving a selection from a user of the first version of the first virtual pet avatar.

In Example 17, the subject matter of Example 16 includes, wherein modifying the prompt comprises iteratively processing a user description of desired characteristics iteratively via an LLM to generate the first and second versions of the prompt.

In Example 18, the subject matter of Examples 16-17 includes, wherein modifying the prompt comprises: modifying a user description of desired characteristics to generate first and second versions of the prompt; and iteratively processing the first and second versions of the prompt via an LLM to generate the first and second versions of the prompt.

Example 19 is a method comprising: receiving, by a computing device of a first user, a real life image of a pet; identifying a prompt corresponding to desired characteristics of a first virtual pet avatar for the first user; processing the real life image of the pet and the prompt by a first generative Artificial Intelligence (AI) model, the first generative AI model being trained to receive images and prompts and to generate virtual pet avatars based on the received images and prompts; and receiving a first virtual pet avatar from the first generative AI model.

Example 20 is a non-transitory computer-readable storage medium storing instructions that, when executed by at least one processor, cause the at least one processor to perform operations comprising: receiving, by a computing device of a first user, a real life image of a pet; identifying a prompt corresponding to desired characteristics of a first virtual pet avatar for the first user; processing the real life image of the pet and the prompt by a first generative Artificial Intelligence (AI) model, the first generative AI model being trained to receive images and prompts and to generate virtual pet avatars based on the received images and prompts; and receiving a first virtual pet avatar from the first generative AI model.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20. Example 24 is a method to implement any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase “hardware component” (or “hardware-implemented component”) should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, “processor-implemented component” refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a “cloud computing” environment or as a “software as a service” (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

“Computer-readable storage medium” refers, for example, to both machine-storage media and transmission media. Thus, the terms include both storage devices/media and carrier waves/modulated data signals. The terms “machine-readable medium,” “computer-readable medium” and “device-readable medium” mean the same thing and may be used interchangeably in this disclosure.

“Machine storage medium” refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms “machine-storage medium,” “device-storage medium,” “computer-storage medium” mean the same thing and may be used interchangeably in this disclosure. The terms “machine-storage media,” “computer-storage media,” and “device-storage media” specifically exclude carrier waves, modulated data signals, and other such media, at least some of which are covered under the term “signal medium.”

“Non-transitory computer-readable storage medium” refers, for example, to a tangible medium that is capable of storing, encoding, or carrying the instructions for execution by a machine.

CONCLUSION

Unless the context clearly requires otherwise, throughout the description and the claims, the words “comprise,” “comprising,” and the like are to be construed in an inclusive sense, as opposed to an exclusive or exhaustive sense, i.e., in the sense of “including, but not limited to.” As used herein, the terms “connected,” “coupled,” or any variant thereof means any connection or coupling, either direct or indirect, between two or more elements; the coupling or connection between the elements can be physical, logical, or a combination thereof. Additionally, the words “herein,” “above,” “below,” and words of similar import, when used in this application, refer to this application as a whole and not to any particular portions of this application. Where the context permits, words using the singular or plural number may also include the plural or singular number respectively.

The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:

at least one processor; and at least one memory component storing instructions that, when executed by the at least one processor, cause the at least one processor to perform operations comprising:

receiving, by a computing device of a first user, a real life image of a pet;

identifying a prompt corresponding to desired characteristics of a first virtual pet avatar for the first user, the prompt identified based on inputting one or more preferences for the first virtual pet avatar from the first user to a large language model (LLM), the LLM trained to receive as input pet preferences and outputting prompts corresponding to the input pet preferences;

processing the real life image of the pet and the prompt by a first generative Artificial Intelligence (AI) model, the first generative AI model being trained to receive images and prompts and to generate virtual pet avatars based on the received images and prompts;

receiving a first virtual pet avatar from the first generative AI model; and applying the LLM-generated prompt to a first interaction function, the first interaction function being different than a second interaction function associated with the first virtual pet avatar, the first interaction function including a second generative AI model, an application of the LLM-generated prompt to the first interaction function causing the second generative AI model to generate a second virtual pet avatar, the second virtual pet avatar being different than the first virtual pet avatar.

2. The system of claim 1, wherein receiving the real life image includes receiving an image captured by a camera of the computing device of the first user.

3. The system of claim 1, wherein receiving the real life image includes identifying a friend of the first user, identifying an image uploaded by the friend of the first user, determining that the image includes a real life pet, determining that the first user reacted to the uploaded image, and identifying the real life pet as the real life image of the pet.

4. The system of claim 1, wherein the first generative AI model comprises a stable diffusion model configured to receive the real life image and the prompt to generate the first virtual pet avatar.

5. The system of claim 1, wherein the first virtual pet avatar comprises a three-dimensional media content item configured to perform one or more animated actions.

6. The system of claim 5, wherein the first generative AI model is configured to generate the first virtual pet avatar to perform the one or more animated actions based on a personality trait within the prompt.

7. The system of claim 1, further comprising removing a background of the first virtual pet avatar to generate a modified virtual pet avatar, and applying the modified virtual pet avatar to one or more interaction functions.

8. The system of claim 1, further comprising applying the prompt and the real life image iteratively to the first generative AI model to generate at least a first and second version of the first virtual pet avatar, and receiving a selection from a user of the first version of the first virtual pet avatar.

9. The system of claim 1, further comprising:

modifying the prompt to create first and second versions of the prompt; and applying the first and second versions of the prompt and the real life image iteratively to the first generative AI model to generate at least a first and second version of the first virtual pet avatar, and receiving a selection from a user of the first version of the first virtual pet avatar.

10. The system of claim 9, wherein modifying the prompt comprises iteratively processing a user description of desired characteristics iteratively via an LLM to generate the first and second versions of the prompt.

11. The system of claim 9, wherein modifying the prompt comprises:

modifying a user description of desired characteristics to generate first and second versions of the prompt; and iteratively processing the first and second versions of the prompt via an LLM to generate the first and second versions of the prompt.

12. A method comprising:

receiving, by a computing device of a first user, a real life image of a pet;

identifying a prompt corresponding to desired characteristics of a first virtual pet avatar for the first user;

processing the real life image of the pet and the prompt by a first generative Artificial Intelligence (AI) model, the first generative AI model being trained to receive images and prompts and to generate virtual pet avatars based on the received images and prompts;

receiving a first virtual pet avatar from the first generative AI model, modifying the prompt to create first and second versions of the prompt, wherein modifying the prompt comprises iteratively processing a user description of desired characteristics iteratively via an LLM to generate the first and second versions of the prompt; and applying the first and second versions of the prompt and the real life image iteratively to the first generative AI model to generate at least a first and second version of the first virtual pet avatar, and receiving a selection from a user of the first version of the first virtual pet avatar.

13. The method of claim 12, further comprising generating the prompt based on one or more preferences for the first virtual pet avatar from the first user.

14. The method of claim 13, wherein generating the prompt comprises inputting the one or more preferences for the first virtual pet avatar to a large language model (LLM) to generate the prompt, the LLM trained to receive as input pet preferences and outputting prompts corresponding to the input pet preferences.

15. The method of claim 14, wherein the LLM is trained to generate prompts configured to be received as input by the first generative AI model.

16. The method of claim 14, further comprising:

applying the LLM-generated prompt to a first interaction function, the first interaction function being different than a second interaction function associated with the first virtual pet avatar, the first interaction function including a second generative AI model, an application of the LLM-generated prompt to the first interaction function causing the second generative AI model to generate a second virtual pet avatar, the second virtual pet avatar being different than the first virtual pet avatar.

17. The method of claim 16, wherein the first interaction function includes an XR application for a wearable device, and the second virtual pet avatar is displayed over a real-world environment.

18. The method of claim 16, wherein the first interaction function includes a content augmentation that overlays the second virtual pet avatar over a real world pet on a real-world video stream.

19. The method of claim 13, further comprising identifying the one or more preferences for the first virtual pet avatar based on interaction data by the first user with an interaction function.

20. A non-transitory computer-readable storage medium storing instructions that, when executed by at least one processor, cause the at least one processor to perform operations comprising:

receiving, by a computing device of a first user, a real life image of a pet;

identifying a prompt corresponding to desired characteristics of a first virtual pet avatar for the first user;

processing the real life image of the pet and the prompt by a first generative Artificial Intelligence (AI) model, the first generative AI model being trained to receive images and prompts and to generate virtual pet avatars based on the received images and prompts;

receiving a first virtual pet avatar from the first generative AI model, modifying the prompt to create first and second versions of the prompt, wherein modifying the prompt comprises:

modifying a user description of desired characteristics to generate first and second versions of the prompt; and iteratively processing the first and second versions of the prompt via an LLM to generate the first and second versions of the prompt; and applying the first and second versions of the prompt and the real life image iteratively to the first generative AI model to generate at least a first and second version of the first virtual pet avatar, and receiving a selection from a user of the first version of the first virtual pet avatar.

* * * * *